(12) United States Patent
Gunturu et al.

(10) Patent No.: US 12,184,454 B2
(45) Date of Patent: Dec. 31, 2024

(54) METHOD AND SYSTEM FOR MANAGING AN INTERSYMBOL INTERFERENCE IN AN ULTRA-HIGH FREQUENCY CELLULAR NETWORK

(71) Applicant: Samsung Electronics Co., Ltd., Suwon-si (KR)

(72) Inventors: Anusha Gunturu, Bangalore (IN); Ashok Kumar Reddy Chavva, Bangalore (IN); Sandeep Joshi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 17/687,419

(22) Filed: Mar. 4, 2022

(65) Prior Publication Data

US 2022/0286325 A1    Sep. 8, 2022

Related U.S. Application Data

(63) Continuation of application No. PCT/KR2022/002993, filed on Mar. 3, 2022.

(30) Foreign Application Priority Data

Mar. 4, 2021  (IN) .............................. 202141009042
Feb. 22, 2022  (IN) ............................. 202141009042

(51) Int. Cl.
*H04L 25/03*    (2006.01)
*H04L 25/02*    (2006.01)
(Continued)

(52) U.S. Cl.
CPC .... *H04L 25/03006* (2013.01); *H04L 25/0202* (2013.01); *H04L 27/26025* (2021.01);
(Continued)

(58) Field of Classification Search
CPC ........... H04L 27/2607; H04L 25/03006; H04L 25/0202; H04L 27/26025; H04L 27/2646;
(Continued)

(56) References Cited

U.S. PATENT DOCUMENTS 10,454,745 B2   10/2019   Lee et al.
10,708,028 B2    7/2020   Nam et al.
(Continued)

FOREIGN PATENT DOCUMENTS

CN    110381463 A    10/2019
WO    2010050731 A2    5/2010
(Continued)

OTHER PUBLICATIONS

Supplementary European Search Report dated Jan. 31, 2024, in connection with European Application No. 22763599.2, 12 pages.
(Continued)

*Primary Examiner* — Vinncelas Louis

(57) ABSTRACT

In an embodiment, a method of a base station (BS) for managing an ISI in a cellular network is disclosed. The method includes receiving at least one UE-Capability information element from a UE comprising a list of CP lengths and a list of SCSs, determining a plurality of parameters associated with the UE based on the list of CP lengths and the list of SCSs, calculating at least one of a first custom CP length and a first SCS based on the plurality of parameters from the list of CP lengths and the list of SCSs, and transmitting, to the UE, a response message indicating that at least one of the first custom CP length and the first SCS is selected for managing the ISI.

20 Claims, 19 Drawing Sheets

(51) Int. Cl.
   *H04L 27/26* (2006.01)
   *H04W 74/0833* (2024.01)
(52) U.S. Cl.
   CPC ...... *H04L 27/2607* (2013.01); *H04L 27/2646* (2013.01); *H04W 74/0833* (2013.01)
(58) Field of Classification Search
   CPC ... H04L 5/0053; H04B 7/024; H04W 74/0833
   See application file for complete search history.

(56) References Cited

U.S. PATENT DOCUMENTS

| | | |
|---|---|---|
| 2011/0149771 A1 | 6/2011 | Abeta et al. |
| 2014/0241447 A1 | 8/2014 | Reddy et al. |
| 2017/0338920 A1 | 11/2017 | Kim et al. |
| 2019/0306862 A1 | 10/2019 | Ly et al. |
| 2020/0229004 A1 | 7/2020 | Eng et al. |
| 2020/0235980 A1 | 7/2020 | Wilson et al. |
| 2022/0078817 A1* | 3/2022 | Zhang .................... H04B 7/024 |
| 2022/0264476 A1 | 8/2022 | Kim et al. |
| 2023/0388089 A1* | 11/2023 | Kwak ................. H04L 27/2607 |

FOREIGN PATENT DOCUMENTS

| | | |
|---|---|---|
| WO | 2019170215 A1 | 9/2019 |
| WO | 2020134121 A1 | 7/2020 |
| WO | 2021034165 A1 | 2/2021 |

OTHER PUBLICATIONS

3GPP TS 38.304 V16.3.0 (Dec. 2020), Technical Specification, 3rd Generation Partnership Project; Technical Specification Group Radio Access Network; NR; User Equipment (UE) procedures in Idle mode and RRC Inactive state (Release 16), Dec. 2020, 39 pages.
3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 2021, 937 pages.
Cohere Technologies, et al., "Overview of OTFS Waveform for Next Generation RAT," R1-162929, 3GPP TSG RA WG1 Meeting #84-bis, Busan, South Korea, Apr. 11-15, 2016, 3 pages.
Hadani, et al., "OTFS: A New Generation of Modulation Addressing the Challenges of 5G," arXiv: 1802.02623v1 [cs.IT], Feb. 7, 2018, 38 pages.
Huawei (summary rapporteur), "Summary of RRM measurement relaxation open issues," R2-200xxxx, 3GPP TSG-RAN WG2 Meeting #109-e, Online, Feb. 24-Mar. 6, 2020, 10 pages.
Li, et al., "A Simple Two-stage Equalizer With Simplified Orthogonal Time Frequency Space Modulation Over Rapidly Time-varying Channels," arXiv: 1709.02505v1 [cs.IT], Sep. 8, 2017, 4 pages.
Ramachandran, et al., "MIMO-OTFS in High-Doppler Fading Channels: Signal Detection and Channel Estimation," 2018 IEEE Global Communications Conference (GLOBECOM), 2018, 6 pages.
Ramachandran, et al., "OTFS: A New Modulation Scheme for 5G and Beyond," NCC '2020 Tutorial, IIT Kharagpur, Feb. 21, 2020, 149 pages.
Raviteja, et al., "Interference Cancellation and Iterative Detection for Orthogonal Time Frequency Space Modulation," arXiv: 1802.05242v2 [cs.IT], Feb. 16, 2018, 30 pages.
Office Action dated Oct. 6, 2022 in connection with India Patent Application No. 202141009042, 6 pages.
International Search Report and Written Opinion of the International Searching Authority dated Jun. 7, 2022, in connection with International Application No. PCT/KR2022/002993, 7 pages.

\* cited by examiner

METHOD AND SYSTEM FOR MANAGING AN INTERSYMBOL INTERFERENCE IN AN ULTRA-HIGH FREQUENCY CELLULAR NETWORK

CROSS-REFERENCE TO RELATED APPLICATIONS

This application is a continuation application, claiming priority under § 365(c), of an International application No. PCT/KR2022/002993, filed on Mar. 3, 2022, which is based on and claims the benefit of an Indian Provisional patent application number 202141009042, filed on Mar. 4, 2021, in the Indian Intellectual Property Office, and of an Indian Complete patent application number 202141009042, filed on Feb. 22, 2022, in the Indian Intellectual Property Office, the disclosures of each of which are incorporated by reference herein in their entirety.

BACKGROUND

1. Field

The present disclosure generally relates to a network and communication, and more particularly to a method and system for managing an inter symbol interference (ISI) in an ultra-high frequency cellular network.

2. Description of Related Art

Traditionally, beyond fifth generation (5G) and sixth generation (6G) may support higher carrier frequencies beyond mmWave frequencies such as 52.6 GHz to 71 GHz or the THz frequencies ranging from 0.1 to 10 THz with huge bandwidth in order to obtain higher data rates. Beyond 5G (B5G) & 6G air interface and associated waveform have to support a number of diverse requirements and usage scenarios like terminal speeds of up to 300 km/h for vehicle-to-vehicle and vehicle-to-infrastructure systems, and new applications like Internet of Things (IoT) and high-velocity connections up to 500 km/h for high-speed train (HST) applications.

Both the high carrier frequency operation (0.1~10 THz) and high velocities (up to 500 Kmph) induce severe a doppler in the signal observed by the receiver of the user equipment (UE). The existing 4G & 5G modulation of orthogonal frequency division multiplexing (OFDM) breaks down in this setting as a channel estimation is no longer effective. Also, the performance of existing OFDM is observed to deteriorate in the case of high Doppler frequencies shifts caused due to high carrier frequency of operation and high mobility.

In Rel-17, FR3 range of frequencies from 52.6 GHz to 71 GHz is being discussed for the extension of NR. The subcarrier spacing (SCS) of 240 kHz, 480 kHz, and 960 kHz are being considered as the additional SCS apart from 120 kHz for this frequency range.

However, for the frequencies beyond the FR3, such as THz, the SCS values could increase further. As the SCS increases, the corresponding cyclic prefix (CP) length also reduces because of the fixed ratio of the CP length to the OFDM symbol length. As an example, below table 1 of 5G NR shows the CP length reducing for the increased SCS values.

| Parameter/Numerology (u) | 0 | 1 | 2 | 3 | 4 |
|---|---|---|---|---|---|
| Subcarrier Spacing (Khz) | 15 | 30 | 60 | 120 | 240 |
| OFDM Symbol Duration (us) | 66.67 | 33.33 | 16.67 | 8.33 | 4.17 |
| Cyclic Prefix Duration (us) | 4.69 | 2.34 | 1.17 | 0.57 | 0.29 |
| OFDM Symbol including CP (us) | 71.35 | 35.68 | 17.84 | 8.92 | 4.46 |

Table 1 Depicts Reduces CP Lengths for Increased SCS Values

One limiting factor for larger SCS value and the correspondingly smaller CP length can be ISI. The multipath channel will cause severe degradation due to the ISI which cannot be compensated with the small CP duration. With large subcarrier spacing required for high carrier frequency operations or high-speed applications, it may be challenging to fit a channel delay spread within a short CP.

Increasing the SCS further beyond the existing SCS values to mitigate this ICI reduces the ability to handle ISI for a fixed cyclic prefix (CP) ratio because of the reduced OFDM symbol duration. Increasing the CP beyond certain length can result in the reduction of spectral efficiency.

Thus, a new waveform can be considered for beyond5G and 6G technologies to mitigate high doppler effects such as orthogonal time frequency space (OTFS) modulation or any new waveform, which has better performance in the higher Doppler scenarios, and suitable for high carrier frequency operations or mobility scenarios compared to OFDM. New waveform or a waveform compatible with OFDM system may be considered for the beyond 5G and 6G technologies to support next generation high frequency operating systems and also high-speed applications. Choosing the waveform based on the channel conditions can help in improving the system performance and also maintain the complexity.

Thus, there is a need for a solution that overcomes the above deficiencies.

SUMMARY

This summary is provided to introduce a selection of concepts, in a simplified format, that are further described in the detailed description of the present disclosure. This summary is neither intended to identify key or essential inventive concepts of the present disclosure and nor is it intended for determining the scope of the present disclosure.

In accordance with some example embodiments of the present disclosure, a method of a base station (BS) for managing an inter-symbol interference (ISI) in a cellular network is disclosed. The method includes receiving, from a user equipment (UE), at least one UE-capability information element comprising a list of cycle prefix (CP) lengths and a list of sub-carriers spaces (SCSs); determining a plurality of parameters associated with the UE based on the list of CP lengths and the list of SCSs; calculating at least one of a first custom CP length and a first SCS based on the plurality of parameters from the list of CP lengths and the list of SCSs; and transmitting, to the UE, a response message indicating that at least one of the first custom CP length or the first SCS is selected for managing the ISI.

In accordance with some example embodiments of the present disclosure, a method of a UE for managing an ISI in a cellular network is disclosed. The method includes connecting with a base station (BS) using at least one of a first custom cyclic prefix (CP) length and a first sub-carrier spacing (SCS) when receiving a response message, wherein the response message comprises at least one of the first custom CP length or the first SCS calculated by the BS;

determining that a channel estimation parameter associated with the UE is less than a pre-determined threshold value when using at least one of the first custom CP length and the first SCS, wherein the channel estimation parameter corresponds to a delay spread of a channel for a high frequency communication; calculating at least one of a second custom CP length and a second SCS in response to determining that the channel estimation parameter is less than the pre-determined threshold value; and transmitting, to the BS, at least one of the second custom CP length and the second SCS for managing the ISI through one of a physical uplink control channel (PUCCH) format or a physical uplink shared channel (PUSCH) format.

In accordance with some example embodiments of the present disclosure, a base station (BS) for managing an inter-symbol interference (ISI) in a cellular network is disclosed. The BS includes a transceiver; and at least one processor operably coupled to the transceiver, wherein the at least one processor is configured to receive at least one user equipment (UE)-capability information element comprising a list of cycle prefix (CP) lengths and a list of sub-carriers spaces (SCSs); determine a plurality of parameters associated with the UE based on the list of CP lengths and the list of SCSs; calculate at least one of a first custom CP length and a first SCS based on the plurality of parameters from the first list of CP lengths and the second list of SCS; and transmit, to the UE, a response message indicating that at least one of the first custom CP length or the first SCS is selected for managing the ISI.

In accordance with some example embodiments of the present disclosure, a user equipment (UE) for managing an inter-symbol interference (ISI) in a cellular network is disclosed. The UE includes a transceiver; and at least one processor operably coupled to the transceiver, wherein the at least one processor is configured to connect with a base station (BS) using at least one of a first custom cyclic prefix (CP) length and a first sub-carrier spacing (SCS) when receiving a response message, wherein the response message comprises at least one of the first custom CP length or the first SCS calculated by the BS determine that a channel estimation parameter associated with the UE is less than a pre-determined threshold value when using at least one of the first custom CP length and the first SCS, wherein the channel estimation parameter corresponds to a delay spread of a channel for a high frequency communication calculate at least one of a second custom CP length and a second SCS in response to determining that the channel estimation parameter is less than the pre-determined threshold value; and transmit, to the BS, at least one of the second custom CP length and the second SCS for managing the ISI through one of a physical uplink control channel (PUCCH) format and a physical uplink shared channel (PUSCH) format.

To further clarify advantages and features of the present disclosure, a more particular description of the present disclosure will be rendered by reference to specific embodiments thereof, which is illustrated in the appended drawings. It is appreciated that these drawings depict only typical embodiments of the present disclosure and are therefore not to be considered limiting of its scope. The present disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
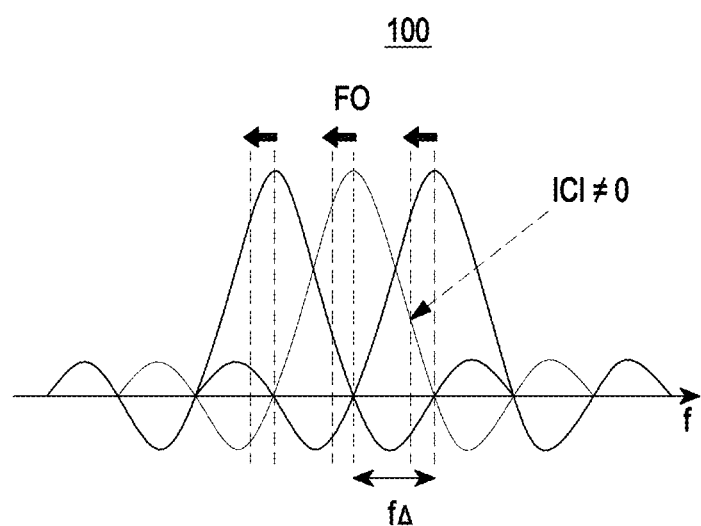
FIG. 1 illustrates an existing diagram depicting an inter carrier interference caused due to frequency offset in accordance with an existing prior-art.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect," "another aspect" or similar language means that a particular feature, structure, or characteristic described in connection with the embodiment is included in at least one embodiment of the present disclosure. Thus, appearances of the phrase "in an embodiment," "in another embodiment" and similar language throughout this specification may, but do not necessarily, all refer to the same embodiment.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which the present disclosure belongs. The system, methods, and examples provided herein are illustrative only and not intended to be limiting.

FIG. 1 illustrates an existing diagram 100 depicting an inter carrier interference caused due to frequency offset. In an embodiment, an observed frequency at the receiver $f_r$ with Doppler frequency shift $f_d$ can be written as mentioned below in equation 1.

$$f_r = f_c + f_d = f_c + \left(\frac{v\cos\theta}{c}\right)f_c. \quad \text{Equation 1}$$

Where $f_c$ is the carrier frequency, c is the speed of light and θ is the angle between BS and the UE. Thus because of the doppler frequency shift in the received frequency as mentioned above, the OFDM observes carrier frequency offset at the receiver which is significant at high doppler frequencies resulting in an inter carrier interference (ICI). The ICI caused due to higher doppler frequency shifts, causes degradation in a signal to noise ratio (SNR) observed, thus resulting in poor performance. For high carrier frequencies or high-speed applications in the next generation technologies such as beyond 5G and 6G, changes to the existing waveform or new waveform other than OFDM have to be identified that can provide good performance mitigating the high doppler effects.

Figure 2:
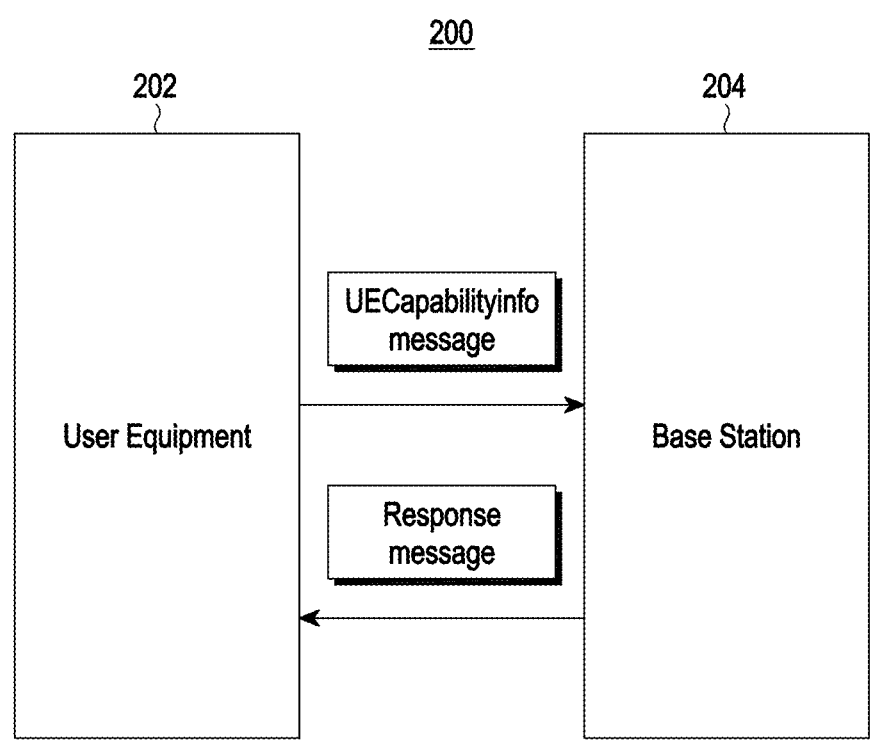
FIG. 2 illustrates an environment including a UE and a BS for managing an ISI in a high frequency cellular network in accordance with various embodiments of the present disclosure.

FIG. 2 illustrates an environment 200 including a User Equipment (UE) 202 and a Base Station (BS) 204 for managing an ISI in a high frequency cellular network in accordance with various embodiments of the present disclosure. In an embodiment, the high frequency cellular network may interchangeably be referred as a high mobility cellular network. In an embodiment, the ISI may be managed based on a custom CP length support for the UE 202 and a configuration exchange between the UE 202 and the BS 204. In an embodiment, managing the ISI may include preventing the ISI when the UE 202 is operating in the high frequency cellular network. In an embodiment, the high frequency cellular network may be configured to support an SCS of a high frequency such as 240 kHz, 480 kHz, and 960 kHz. Examples of the UE 202 may include, but are not limited to, a smartphone, a personal computer (PC), a laptop, and a tablet. In an embodiment, the cellular network may be one of a long-term evolution (LTE), a new radio (NR), and a 6G network.

According to novel aspect of the present disclosure, the BS 204 may be configured to receive at least one UE-Capability information element from the UE 202. In an embodiment, the at least one UE-Capability information element may be an UECapabilityInfo message. In an embodiment, the at least one UE-Capability information element may include a first list of CP lengths and a second list of SCS. In an embodiment, the first list of CP lengths may include a normal CP length and one or more extended CP lengths associated with an orthogonal frequency-division multiplexing (OFDM) symbol duration. In an embodiment, the second list of SCS may include at least one of the higher frequencies such as 240 kHz, 480 kHz, and 960 kHz supported by the cellular network.

Continuing with the above embodiment, in response to receiving the at least one UE-Capability information element, the BS 204 may be configured to determine a number of parameters associated with the UE 202 based on the first list of CP lengths and the second list of SCS. Subsequent to determining the number of parameters, the BS 204 may be configured to calculate at least one of a first custom CP length and a first SCS based on the number of parameters from the first list of CP lengths and the second list of SCS. In an embodiment, at least one of the first custom CP length and the first SCS may be utilized for preventing the ISI in the high frequency network.

In response to calculation of at least one of the first custom CP length and the first SCS, the BS 204 may be configured to transmit the calculated at least one of the first custom CP length and the first SCS to the UE 202. In an embodiment, the calculated at least one of the custom CP length and the first SCS may be transmitted to the UE 202 within a response message indicating that at least one of the first custom CP length and the first SCS is selected for preventing the ISI. In an embodiment, the BS 204 may be configured to communicate with the UE 202 for transmitting the response message via one of a downlink control information (DCI) format, a radio resource control reconfiguration, and a master information block (MIB).

Continuing with the above embodiment, the UE 202 may be configured to receive the response message from the BS 204. In response to receiving the response message, the UE 202 may be configured to connect with the BS 204. In an embodiment, a connection between the UE 202 and the BS 204 may be configured using at least one of the first custom CP length and the first SCS calculated by the BS 204.

Upon connecting with the BS 204, the UE 202 may be configured to determine that a channel estimation parameter associated with the UE 202 is below a pre-determined threshold value when using at least one of the first custom CP length and the first SCS. In an embodiment, the channel estimation parameter may be related to a delay spread of a channel for a high frequency communication by the UE 202. To that understanding, the UE 202 may be configured to calculate at least one of a second custom CP length and a second SCS related to the UE 202 for the high frequency communication in response to determining that the channel estimation parameter is below the pre-determined threshold value.

In response to calculating at least one of the second custom CP length and the second SCS, the UE 202 may be configured to transmit the at least one of the second custom CP length and the second SCS to the BS 204 for preventing the ISI. In an embodiment, at least one of the second custom CP length and the second SCS may be transmitted to the BS 204 via one of a PUCCH format and a PUSCH format. In an embodiment, at least one of the second custom CP length and the second SCS may be utilized by the UE 202 for the communication in the high frequency cellular network.

In accordance with an embodiment of the present disclosure, the present disclosure may be configured to support the first custom CP length and the second custom CP length other than the normal CP length and the one or more extended CP lengths in beyond 5G technologies supporting a high carrier frequency than mmWave frequencies or higher mobility. In an embodiment, a number of different ratios of any CP length to a symbol duration in the beyond 5G technologies may be supported. In an embodiment, the BS 204 may be configured to indicate a single value or a set of SCS and CP values of PBCH/uplink data/downlink data/RACH transmissions through RRC Reconfiguration message.

Figure 3A:
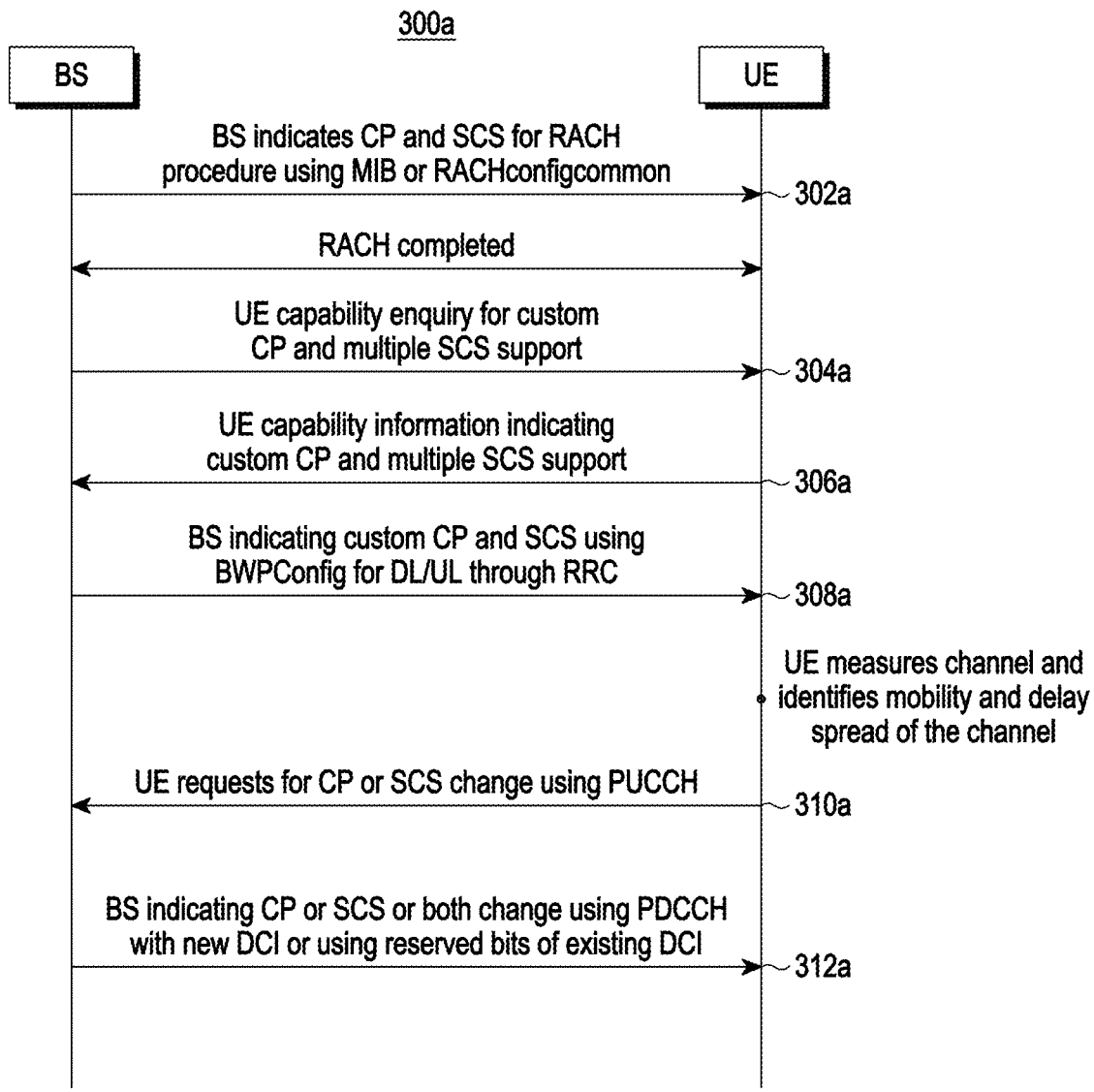
FIG. 3A illustrates an operational flow diagram depicting a process for managing an ISI in a high frequency cellular network in accordance with various embodiments of the present disclosure.

FIG. 3A illustrates an operational flow diagram 300a depicting a process for managing an ISI in a high frequency cellular network in accordance with various embodiments of the present disclosure. In an embodiment, the managing the ISI may including preventing occurrence of the ISI when the UE 202 is operating in the high frequency cellular network. In an embodiment, the ISI may be managed by the UE 202 and the BS 204. Examples of the UE 202 may include, but are not limited to, a smartphone, a PC, a laptop, and a tablet. In an embodiment, the cellular network may be one of an LTE, an NR, and a 6G network.

Continuing with the above embodiment, the process may include indicating (step 302a) the UE 202 about at least one of a default CP length and a default SCS for initiating a random access channel (RACH) procedure by the BS 204. In an embodiment, the at least one of the default CP length and the default SCS may be indicated using one of a MIB and a Radio Resource Control reconfiguration (RACHConfigCommon). In an embodiment, at least one of the default CP length and the default SCS may be utilized to prevent the ISI when the UE 202 is communicating in the high frequency cellular network by the BS 204. Further, the initiated RACH procedure may be completed upon indicating the UE 202.

Moving forward, upon successful completion of the RACH procedure between the UE 202 and the BS 204, the process may proceed towards transmitting (step 304a) an enquiry by the BS 204 to the UE 202 about a custom CP length and a multiple SCS support. In an embodiment, the enquiry may be transmitted to obtain information about at least one of a custom CP length and at least one SCS supported by the UE 202 that may be utilized for preventing the ISI. In an embodiment, the ISI may be prevented based on a custom CP length support for the UE 202 and a configuration exchange between the UE 202 and the BS 204.

Continuing with the above embodiment, in response to receiving the enquiry at the UE 202, the process may proceed towards transmitting (step 306a) at least one UE-Capability information element from the UE 202 to the BS 204. In an embodiment, the at least one UE-Capability information element may be an UECapabilityInfo message including a first list of CP lengths and a second list of SCS. In an embodiment, the first list of CP lengths may include a normal CP length and one or more extended CP lengths associated with an OFDM symbol duration. In an embodiment, the second list of SCS may include at least one of the higher frequencies such as 240 kHz, 480 kHz, and 960 kHz supported by the cellular network. In an embodiment, the normal CP length may be referred as $$\left\{\frac{1}{n1}, \frac{1}{n2}, \ldots, \frac{1}{8}, \frac{1}{4}, \ldots\right\}$$

of an OFDM symbol duration and the one or more extended CP lengths. In an embodiment, the "n" may be a number of custom CP length supported. In an embodiment, the UE may be configured to report a capability of the UE for the custom CP lengths such as {1/n1, 1/n2, . . . , ⅛, ¼, . . . } of the OFDM symbol duration or {extendedCP, extendedCP1, extendedCP2, extendedCPn}, where "n" may be decided based on the implementation complexity and target key performance indicators (KPIs).

In an embodiment, the normal CP length may be referred as a $$\text{"}customCP\text{ ENUMERATRED }\left\{\frac{1}{n1}, \frac{1}{n2}, \ldots, \frac{1}{8}, \frac{1}{4}\right\}\text{"}$$

and the one or more extended CP lengths may be referred as "customCP ENUMERATED {extendedCP1, extendedCP2, . . . , extendedCPn}". In an embodiment, each CP length may be indicated as a fraction of OFDM symbol duration:

$$\left\{\frac{1}{n1}, \frac{1}{n2}, \ldots, \frac{1}{8}, \frac{1}{4}, \ldots\right\}$$

of the OFDM symbol duration or through a type of CP length that may be indicated as {CP1, CP2, . . . , CPn} that may be corresponding to different lengths of a CP.

In an embodiment, the first list of CP lengths may include a number of existing CP lengths as depicted in the table 2 below.

| BandNR ::= | SEQUENCE { | |
|---|---|---|
| bandNR | FreqBandIndicatorNR, | |
| modifiedMPR-Behaviour | BIT STRING (SIZE (8)) | OPTIONAL, |
| mimo-ParametersPerBand | MIMO-parametersPerBand | OPTIONAL, |
| extendedCP | ENUMERATED {supported} | OPTIONAL, |
| multipleTCI | ENUMERATED {supported} | OPTIONAL, |
| bwp-WithoutRestriction | ENUMERATED {supported} | OPTIONAL, |
| bwp-SameNumerology | ENUMERATED {upto2, upto4} | OPTIONAL, |
| bwp-DiffNumerology | ENUMERATED {upto4} | OPTIONAL, |
| crossCarrierScheduling-SameSCS | ENUMERATED {supported} | OPTIONAL, |
| pdsch-256QAM-FR2 | ENUMERATED {supported} | OPTIONAL, |

Table 2 Depicts Existing CP Lengths

In an embodiment, the second of SCS may also include a number of existing SCS as depicted in table 3 below.

```
-- ASN1START
-- TAG-FEATURESETDOWNLINKPERCC-START
FeatureSetDownlinkPerCC ::=      SEQUENCE {
    supportedSubcarrierSpacingDL    SubcarrierSpacing,
    supportedBandwidthDL            SupportedBandwidth,
    channelBW-90mhz                 ENUMERATED {supported}
    maxNumberMIMO-LayersPDSCH       MIMO-LayersDL
-- ASN1START
-- TAG-FEATURESETUPLINKPERCC-START
FeatureSetUplinkPerCC ::=        SEQUENCE {
    supportedSubcarrierSpacingUL    SubcarrierSpacing,
    supprotedBandwidthUL            SupprotedBandwidth,
    channelBW-90mhz                 ENUMERATED {supported}         OPTIONAL,
-- ASN1START
-- TAG-SUBCARRIERSPACING-START
```

-continued

```
SubcarrierSpacing ::=           ENUMBERATED (kHz15, kHz30, kHz60, kHz120, kHz240,
spare3, spare2, spare1}
-- TAG-SUBCARRIERSPACING-STOP
-- ASN1STOP
```

Table 3 Depicts Existing SCS

In response to receiving the at least one UE-Capability information element at the BS 204, the process may include indicating (step 308a) by the BS 204, the UE 202, that at least one of a first custom CP length and a first SCS is selected for preventing the ISI. In an embodiment, the at least one of the first custom CP length and the first SCS may be calculated from the first list of CP lengths and the second list of SCS received in the at least one UE-Capability information element. In an embodiment, upon receiving the first list of CP lengths and the second list of SCS, the BS 204 may be configured to determine a number of parameters associated with the UE 202 based on the first list of CP lengths and the second list of SCS.

In an embodiment, the number of parameters may include at least one of channel information, speed of the UE, a mobility of the UE, a channel state information (CSI) feedback, a delay spread of a channel, a doppler spread/shift in the channel, and at least one other parameter derived from the channel information. Moving forward, the BS 204 may be configured to calculate at least one of the first custom CP length and the first SCS based on the number of parameters.

In an embodiment, the BS 204 may be configured to indicate the UE 202 through a response message indicating that at least one of the first custom CP length and the first SCS is selected for preventing the ISI to the UE 202. In an embodiment, the response message may be transmitted via one of a DCI format, a RRC reconfiguration, a MIB, and a medium access control element (MAC CE).

In an embodiment, the DCI may include at least one of an identifier of the DCI format for at least one of the first custom CP length and the first SCS, a number of bits associated with at least one of the first custom CP length and the first SCS, a description indicating at least one of the first custom CP length and the first SCS. In an embodiment, the RRC reconfiguration may include at least one of the first custom CP length and the first SCS. In an embodiment, the MIB may include at least one of the first custom CP length and the first SCS. Furthermore, the MAC CE may include a bitmap associated with at least one of the first custom CP length and the first SCS with each bit representing a subset for a CP length value associated with the first custom CP length and a SCS value associated with the first SCS.

| Parameter | No. of Bits | Description |
|---|---|---|
| Identifier of DCI format | 1 | Uplink/downlink DCI format |
| SCS indicator | $\log_2 N$ | To indicate one selected SCS out of N SCS |
| CP indicator | $\log_2 M$ | To indicate one selected CP out of M CP lengths |

Table 4 Depicts a Short PDCCH, a New DCI Format for a Dedicated User or Group Common DCI

| Parameter | No. of Bits | Description |
|---|---|---|
| Identifier of DCI format | 1 | Uplink/Downlink flag |
| Carrier Indicator | 0 or 3 bits | Carrier Indication |
| UL/SUL indicator | 0/1 bit | Supplementary Uplink indication |
| BWP indicator | 0/1/2 bits | Bandwidth part indication |
| . | . | . |
| SCS indicator | $\log_2 N$ | To indicate one selected SCS out of N SCS |
| CP indicator | $\log_2 M$ | To indicate one selected CP out of M CP lengths |

Table 5 Depicts Existing DCI Format Appending SCS and CP Indicators

In response to receiving the response message, the UE 202 may be configured to connect with the BS 204 using at least one of the first custom CP length and the first SCS. Moving forward, the process may include requesting (step 310a) the BS 204 by the UE 202 about replacing at least one of the first custom CP length and the first SCS with at least one of a second custom CP length and a second SCS selected by the UE 202 for preventing the ISI.

In an embodiment, for selecting the at least one of the second custom CP length and the second SCS, the process may include determining by the UE 202 that a channel estimation parameter associated with the UE 202 is below a pre-determined threshold value when using at least one of the first custom CP length and the first SCS. In an embodiment, the channel estimation parameter may correspond to a delay spread of a channel for a high frequency communication. Further, the process may include calculating by the UE 202 at least one of the second custom CP length and the second SCS in response to determining that the channel estimation parameter is below the pre-determined threshold value. In an embodiment, the request by the UE 202 may be transmitted through one of a PUCCH format and a PUSCH format.

To that understanding, the upon requesting the BS 204, the process may proceed towards, receiving (step 312a) from the BS 204 at the UE 202, an indication about an implementation of at least one of the second custom CP length and the second SCS. In an embodiment, the BS 204 may be configured to transmit the indication through one of a physical downlink control channel (PDCCH) with a second DCI and a number of reserved bits of a first DCI.

Figure 3B:
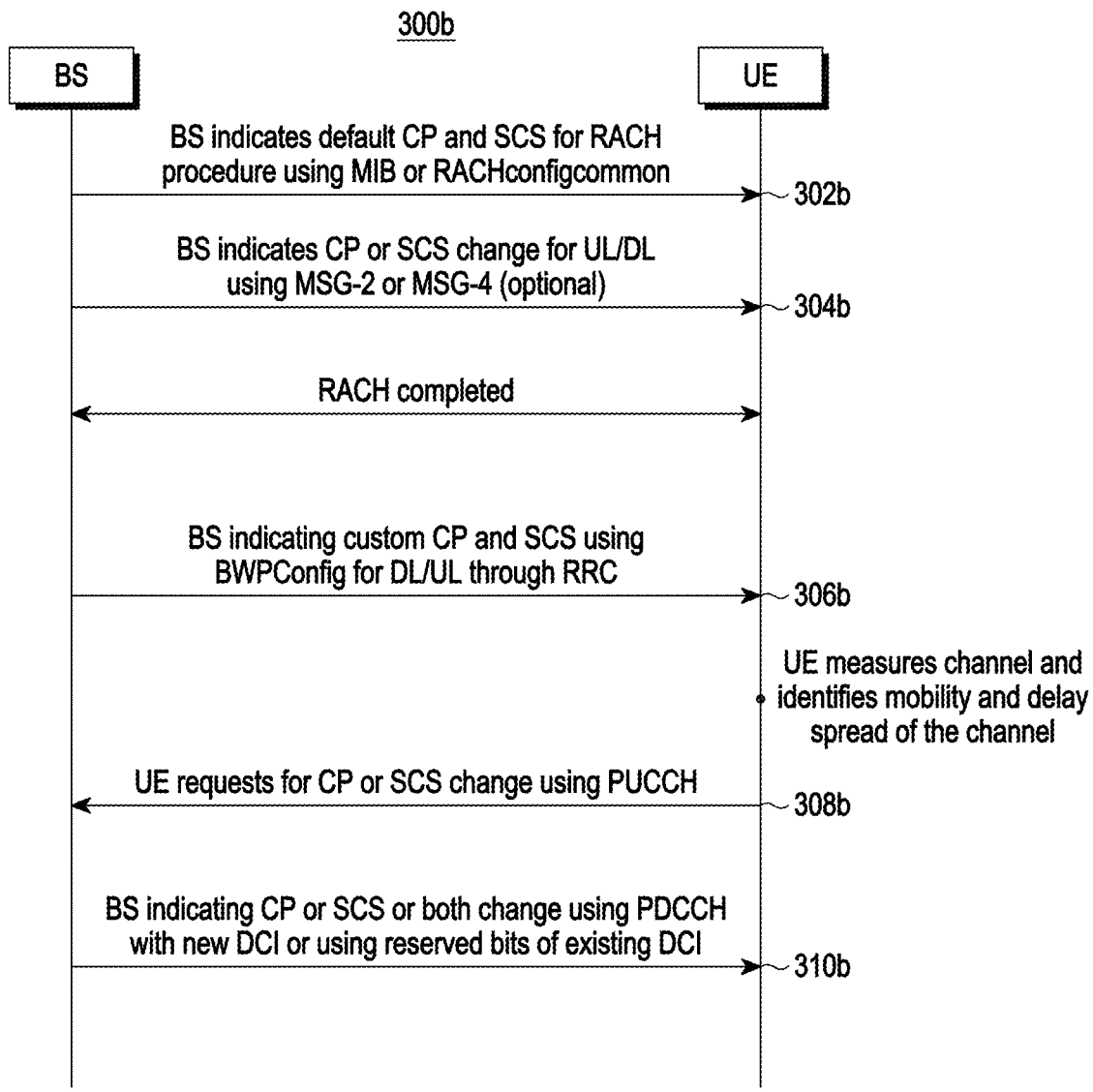
FIG. 3B illustrates an operational flow diagram depicting a process for managing the ISI when the UE mandatorily supports each CP length and each SCS by default in accordance with various embodiments of the present disclosure.

FIG. 3B illustrates an operational flow diagram 300b depicting a process for managing the ISI when the UE 202 mandatorily supports each CP length and each SCS by default in accordance with various embodiments of the present disclosure. In an embodiment, each CP length from a number of CP lengths and each SCS from a number of SCS may be related to the UE 202.

Continuing with the above embodiment, the process may include indicating (step 302b) the UE 202 about at least one of a default CP length and a default SCS for initiating the RACH procedure by the BS 204. In an embodiment, at least one of the default CP length and the default SCS may be indicated using one of a MIB and a Radio Resource Control reconfiguration (RACHConfigCommon). In an embodiment, at least one of the default CP length and the default SCS may be utilized to prevent the ISI when the UE 202 is communicating in the high frequency cellular network by the BS 204. Further, the initiated RACH procedure may be completed upon indicating the UE 202.

Upon indicating the UE 202 about at least one of the default CP length and the default SCS by the BS 204, the process may include indicating (304*b*) the UE 202 by the BS 204, a change associated with at least one of the default CP and the default SCS for one or more of an uplink UL transmission and a downlink DL transmission. In an embodiment, the change may be indicated upon indicating the UE 202 about the default CP and the default SCS. Further, the process may include initiating the RACH procedure with the UE 202 upon indicating the UE 202 about the default CP and the default SCS.

Moving forward, the process may include performing step 306*b*, 308*b*, and 310*b* similar to steps 308*a*-312*a* as described in the FIG. 3A for indicating that at least one of the second custom CP length and the second SCS may be selected for preventing the ISI when the UE 202 is communicating in the high frequency cellular network.

Figure 4A:
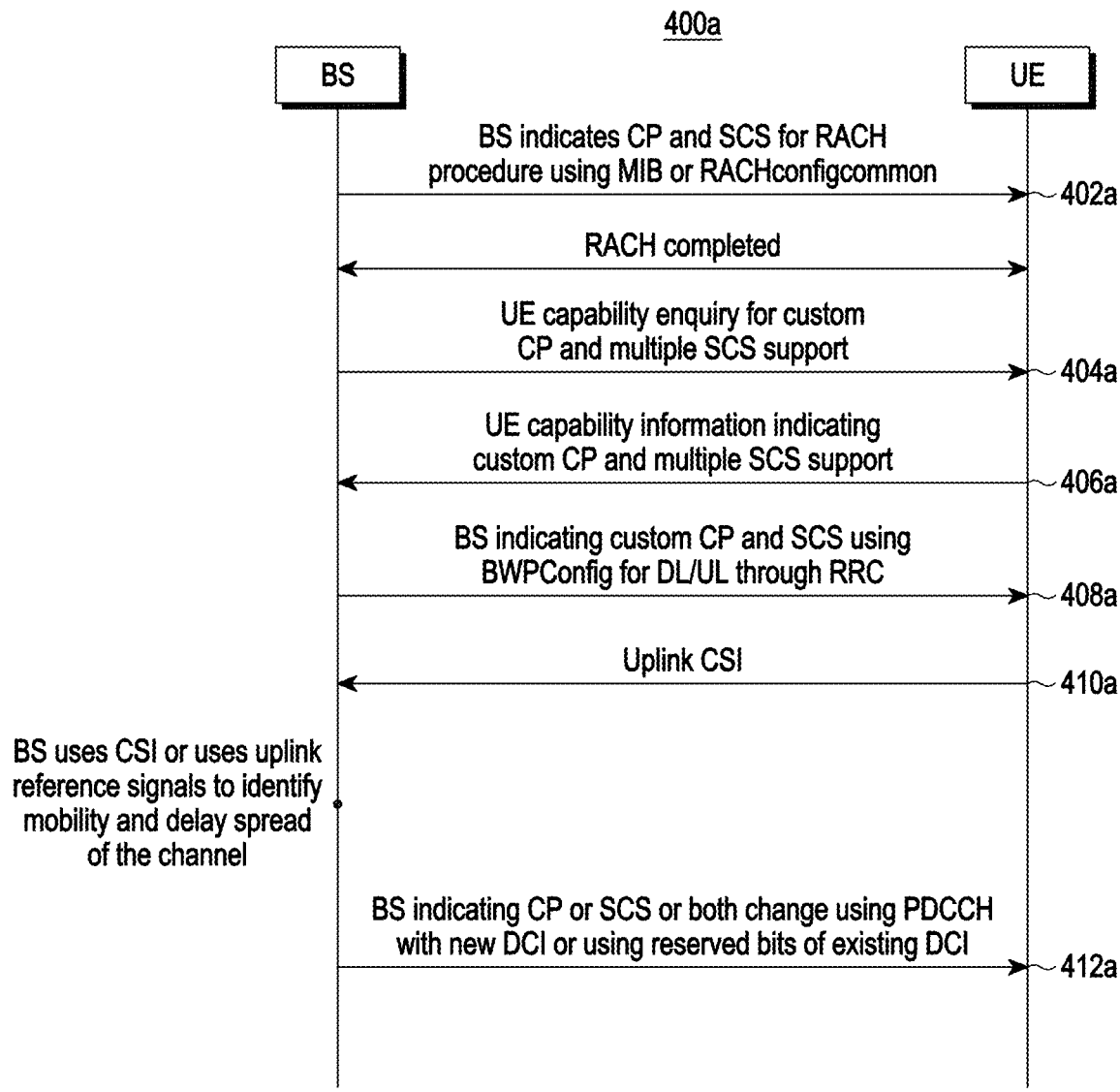
FIG. 4A illustrates an operational flow diagram depicting a process for managing an ISI in a high frequency cellular network based on the BS identifying a mobility and a delay spread of a channel in accordance with various embodiments of the present disclosure.

FIG. 4A illustrates an operational flow diagram 400*a* depicting a process for managing an ISI in a high frequency cellular network based on the BS 204 identifying a mobility and a delay spread of a channel in accordance with various embodiments of the present disclosure. In an embodiment, the managing the ISI may including preventing occurrence of the ISI when the UE 202 is operating in the high frequency cellular network. In an embodiment, managing the ISI may be based on at least one of a number of CP lengths and a number of SCS associated with the UE 202 communicating in the high frequency cellular network.

Continuing with the above embodiment, the process may include indicating (step 402*a*) the UE 202 about at least one of a default CP length and a default SCS for initiating a RACH procedure by the BS 204 using one of a MIB and a Radio Resource Control reconfiguration (RACHConfigCommon). In an embodiment, at least one of the default CP length and the default SCS may be utilized to prevent the ISI when the UE 202 is communicating in the high frequency cellular network by the BS 204. Further, the initiated RACH procedure may be completed upon indicating the UE 202.

Moving forward, upon successful completion of the RACH procedure between the UE 202 and the BS 204, the process may proceed towards transmitting (step 404*a*) an enquiry by the BS 204 to the UE 202 about a custom CP length and a multiple SCS support. In an embodiment, the enquiry may be transmitted to obtain information about at least one of at least one custom CP length and at least one SCS supported by the UE 202 that may be utilized for preventing the ISI. In an embodiment, the ISI may be prevented based on a custom CP length support for the UE 202 and a configuration exchange between the UE 202 and the BS 204.

Continuing with the above embodiment, in response to receiving the enquiry at the UE 202, the process may proceed towards transmitting (step 406*a*) at least one UE-Capability information element from the UE 202 to the BS 204. In an embodiment, the at least one UE-Capability information element may be an UECapabilityInfo message including a first list of CP lengths and a second list of SCS. In an embodiment, the first list of CP lengths may include a normal CP length and one or more extended CP lengths associated with an OFDM symbol duration. In an embodiment, the second list of SCS may include at least one of the higher frequencies such as 240 kHz, 480 kHz, and 960 kHz supported by the cellular network.

In response to receiving the at least one UE-Capability information element by the BS 204, the process may include indicating (step 408*a*) by the BS 204 to the UE 202, that at least one of a first custom CP length and a first SCS is selected for preventing the ISI to the UE 202. In an embodiment, at least one of the first custom CP length and the first SCS may be calculated from the first list of CP lengths and the second list of SCS. In an embodiment, upon receiving the first list of CP lengths and the second list of SCS, the BS 204 may be configured to determine a number of parameters associated with the UE 202 based on the first list of CP lengths and the second list of SCS.

In an embodiment, the number of parameters may include at least one of channel information, speed of the UE, a mobility of the UE, a CSI feedback, a delay spread of a channel, a doppler spread/shift in the channel, and at least one other parameter derived from the channel information. Moving forward, the BS 204 may be configured to calculate at least one of the first custom CP length and the first SCS based on the number of parameters from the first list of CP lengths and the second list of SCS.

In an embodiment, the BS 204 may be configured to indicate the UE 202 through a response message that at least one of the first custom CP length and the first SCS is selected for preventing the ISI. In an embodiment, the response message may be transmitted via one of DCI format, a RRC reconfiguration, a MIB, and a MAC CE.

In an embodiment, the DCI may include at least one of an identifier of the DCI format for at least one of the first custom CP length and the first SCS, a number of bits associated with at least one of the first custom CP length and the first SCS, a description indicating at least one of the first custom CP length and the first SCS. In an embodiment, the RRC reconfiguration may include at least one of the first custom CP length and the first SCS. In an embodiment, the MIB may include at least one of the first custom CP length and the first SCS. Furthermore, the MAC CE may include a bitmap associated with at least one of the first custom CP length and the first SCS with each bit representing a subset for a CP length value associated with the first custom CP length and a SCS value associated with the first SCS.

In response to transmitting the response message indicating that at least one of the first custom CP length and the first SCS is selected for preventing the ISI to the UE 202, the process may proceed towards receiving (step 410*a*) at the BS 204 an UL CSI to identify the delay spread of the channel. Moving forward, upon receiving the uplink CSI, the process may include determining by the BS 204 that a channel estimation parameter associated with the UE 202 is below the pre-determined threshold value when using at least one of the first custom CP length and the first SCS. In an embodiment, the channel estimation parameter may correspond to the delay spread of the channel for a high frequency communication. Upon the determination, the process may proceed towards calculating by the BS 204 at least one of a second custom CP length and a second SCS for preventing the ISI.

Continuing with the above embodiment, the process may proceed towards indicating (step 412*a*) the UE 202 by the BS 204 about an implementation of at least one of the second custom CP length and the second SCS using one of for preventing the ISI through one of a PDCCH with a second DCI and a number of reserved bits of a first DCI. In an embodiment, the BS 204 may be configured to indicate the UE 202 via one of the DCI format, the RRC reconfiguration, the MIB, and the MAC CE.

Figure 4B:
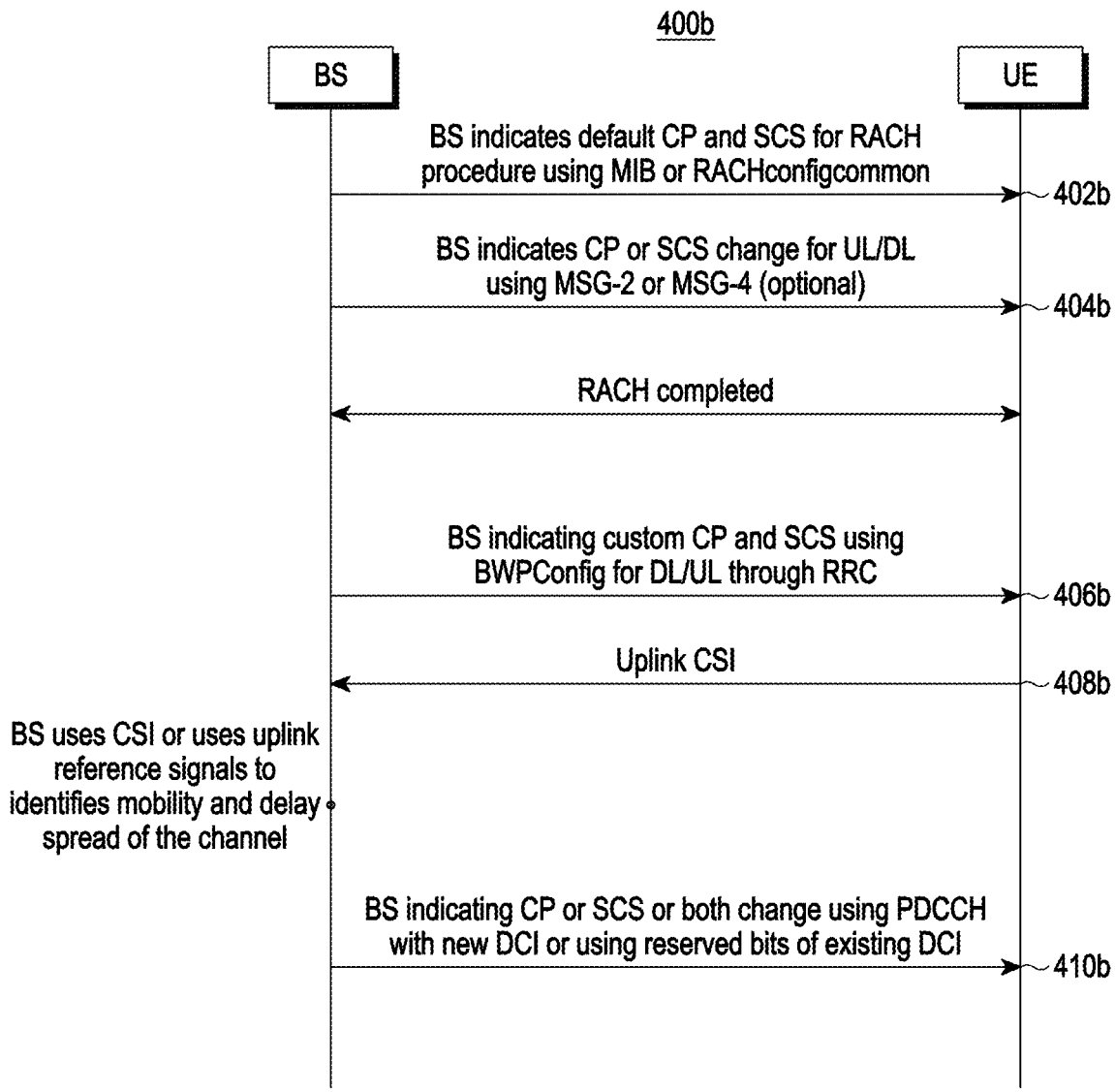
FIG. 4B illustrates an operational flow diagram depicting a process for managing the ISI when the UE mandatorily supports each CP length and each SCS by default and the BS identifies a mobility and a delay spread of a channel in accordance with various embodiments of the present disclosure.

FIG. 4B illustrates an operational flow diagram 400*b* depicting a process for managing the ISI when the UE 202 mandatorily supports each CP length and each SCS by default and the BS 204 identifies a mobility and a delay spread of a channel in accordance with various embodiments of the present disclosure. In an embodiment, each CP length from a number of CP lengths and each SCS from a number of SCS may be related to the UE 202.

Continuing with the above embodiment, the process may include indicating (step 402*b*) the UE 202 about at least one of a default CP length and a default SCS for initiating a RACH procedure by the BS 204. In an embodiment, at least one of the default CP length and the default SCS may be indicated using one of a MIB and a Radio Resource Control reconfiguration (RACHConfigCommon). In an embodiment, at least one of the default CP length and the default SCS may be utilized to prevent the ISI when the UE 202 is communicating in the high frequency cellular network by the BS 204. Further, the initiated RACH procedure may be completed upon indicating the UE 202.

Upon indicating the UE 202 about at least one of the default CP length and the default SCS, the process may include indicating (404*b*) the UE 202 by the BS 204, a change associated with at least one of the default CP and the default SCS for one or more of an UL transmission and a DL transmission. In an embodiment, the change may be indicated upon indicating the UE 202 about at least one of the default CP and the default SCS. Further, the process may include initiating the RACH procedure with the UE 202 upon indicating the UE 202 about the default CP and the default SCS.

Moving forward, the process may include performing step 406*b*, 408*b*, and 410*b* similar to steps 408*a*, 410*a*, and 412*a* as described in the FIG. 4A for indicating that at least one of the second custom CP length and the second SCS may be selected for preventing the ISI when the UE 202 is communicating in the high frequency cellular network.

Figure 5:
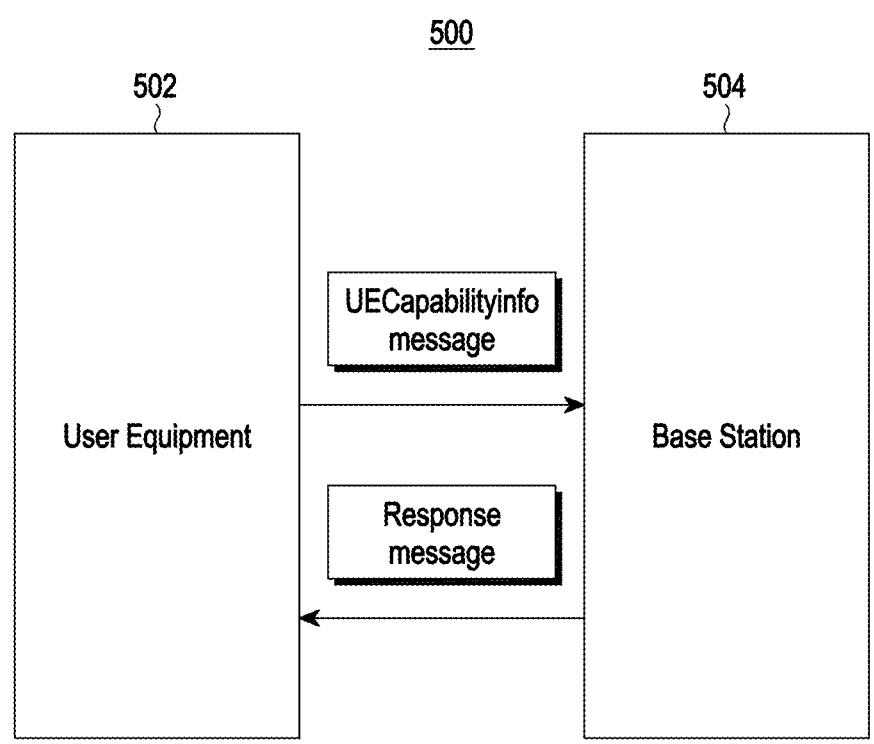
FIG. 5 illustrates an environment including the UE and the BS for switching a waveform for managing an ISI in a high frequency cellular network in accordance with various embodiments of the present disclosure.

FIG. 5 illustrates an environment 500 including the UE 202 and the BS 204 for switching a waveform for managing an ISI in a high frequency cellular network in accordance with various embodiments of the present disclosure. Examples of the UE 202 may include, but are not limited to, a smartphone, a PC, a laptop, and a tablet. In an embodiment, the cellular network may be one of an LTE, an NR, and a 6G network. In an embodiment, managing the ISI may include preventing the ISI faced by the UE 202 communicating in the high frequency cellular network. In an embodiment, preventing the ISI may include a configuration exchange between the BS 204 and the UE 202 a number of methods for indicating a waveform change based on a mobility and channel conditions related to the UE 202.

According to novel aspect of the present disclosure, the BS 204 may be configured to receive at least one UE-Capability information element from the UE 202. In an embodiment, the at least one UE-Capability information element may be an UECapabilityInfo message. In an embodiment, the at least one UE-Capability information element may include an indication of a capability of the UE 202 to switch waveforms amongst a list of waveforms for an UL transmission and a DL transmission. In an embodiment, the UE 202 may be communicating through a previous waveform such as an existing OFDM waveform. In an embodiment, the UE 202 may mandatorily support a CP-OFDM, and a DFT-S-OFDM.

Continuing with the above embodiment, in response to receiving the at least one UE-Capability information element, the BS 204 may be configured to determine a number of parameters associated with the UE 202. In an embodiment, the number of parameters may be determined based on the capability of the UE 202 for the switching waveforms. Subsequent to determining the number of parameters, the BS 204 may be configured to determine a first custom waveform from the list of waveforms based on the number of parameters. In an embodiment, the first custom waveform may be utilized for preventing the ISI in the high frequency cellular network.

In response to determination of the first custom waveform, the BS 204 may be configured to transmit the determined first custom waveform to the UE 202. In an embodiment, the determined first custom waveform may be transmitted to the UE 202 within a response message indicating that the first custom waveform is selected for preventing the ISI. In an embodiment, the BS 204 may be configured to communicate with the UE 202 for transmitting the response message via one of a DCI format, a RRC reconfiguration, and a MIB. Continuing with the above embodiment, the UE 202 may be configured to receive the response message from the BS 204 and connect with the BS 204 using the first custom waveform.

Upon connecting the UE 202 may be configured to determine that a channel estimation parameter associated with the UE 202 is below a pre-determined threshold value when using the first custom waveform. In an embodiment, the channel estimation parameter may be related to a delay spread of a channel for a high frequency communication by the UE 202.

To that understanding, the UE 202 may be configured to calculate a second custom waveform related to the UE 202 for the high frequency communication in response to determining that the channel estimation parameter is below the pre-determined threshold value. In response to calculating the second custom waveform, the UE 202 may be configured to transmit the second custom waveform to the BS 204 for preventing the ISI via one of PUCCH format and a PUSCH format. In an embodiment, the second custom waveform may be utilized by the UE 202 for the communication in the high frequency cellular network.

Figure 6A:
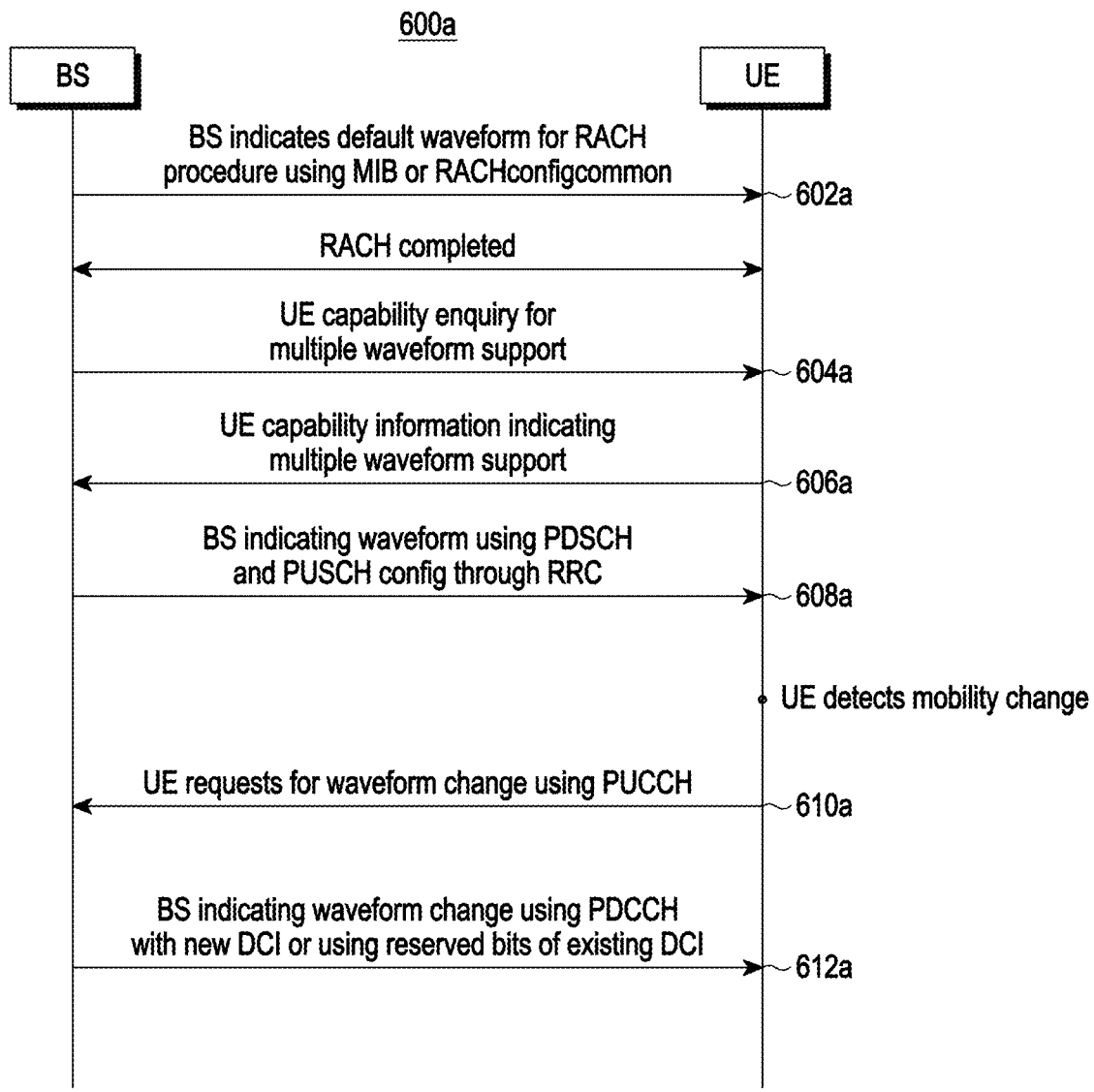
FIG. 6A illustrates an operational flow diagram depicting a process for switching waveforms for managing an ISI in a high frequency cellular network in accordance with various embodiments of the present disclosure.

FIG. 6A illustrates an operational flow diagram 600*a* depicting a process for switching waveforms for managing an ISI in a high frequency cellular network in accordance with various embodiments of the present disclosure. In an embodiment, the managing the ISI may including preventing occurrence of the ISI when the UE 202 is operating in the high frequency cellular network. In an embodiment, the ISI may be managed by the UE 202 and the BS 204. Examples of the UE 202 may include, but are not limited to, a smartphone, a PC, a laptop, and a tablet. In an embodiment, the cellular network may be one of an LTE, an NR, and a 6G network.

Continuing with the above embodiment, the process may include indicating (step 602*a*) the UE 202 about a default waveform for initiating a RACH procedure by the BS 204. In an embodiment, the default waveform may be indicated using one of a MIB and a radio resource control reconfiguration (RACHConfigCommon). In an embodiment, the default waveform may be utilized to prevent the ISI when the UE 202 is communicating in the high frequency cellular network by the BS 204. Further, the initiated RACH procedure may be completed upon indicating the UE 202.

Moving forward, upon successful completion of the RACH procedure, the process may proceed towards transmitting (step 604a) an enquiry by the BS 204 to the UE 202 about a multiple waveform support. In an embodiment, the enquiry may be transmitted to obtain information about a custom waveform supported by the UE 202 that may be utilized for preventing the ISI. In an embodiment, the ISI may be prevented based on a waveform support for the UE 202 and a configuration exchange between the UE 202 and the BS 204.

Continuing with the above embodiment, in response to receiving the enquiry at the UE 202, the process may proceed towards transmitting (step 606a) at least one UE-Capability information element from the UE 202 to the BS 204. In an embodiment, the at least one UE-Capability information element may be an UECapabilityInfo message including an indication of a capability of the UE 202 to switch waveforms amongst a list of waveforms for an UL transmission and a DL transmission. In an embodiment, the UE 202 may be communicating through a previous waveform. In an embodiment, the UE 202 may mandatorily support a cyclic prefix-orthogonal frequency division multiplexing (CP-OFDM), and a discrete Fourier transform-spread-orthogonal frequency division multiplexing (DFT-S-OFDM).

In response to receiving the at least one UE-Capability information element by the BS 204, the process may include indicating (step 608a) by the BS 204 to the UE 202, that a first custom waveform is selected for preventing the ISI. In an embodiment, the first custom waveform may be calculated from the list of waveforms amongst which the UE 202 is capable to switch waveforms as indicated in the at least one UE-CapabilityInfo element. In an embodiment, the UE 202 may be configured to indicate the capability of the waveform support as below:

a) supportedWaveformUL: = ENUMERATED{CP-OFDM, DFT-S-OFDM, OTFS, spare1, spare2, ...}; and
b) supportedWaveformDL: = ENUMERATED{CP-OFDM, OTFS, spare1, spare2, ...}.

In an embodiment, upon receiving the at least one UE-CapabilityInfo element, the BS 204 may be configured to determine a number of parameters associated with the UE 202 based on the first list waveforms. In an embodiment, the number of parameters may include at least one of channel information, speed of the UE, a mobility of the UE, a CSI feedback, a delay spread of a channel, a doppler spread/shift in the channel, and at least one other parameter derived from the channel information. Moving forward, the BS 204 may be configured to calculate the first custom waveform based on the number of parameters.

In an embodiment, the BS 204 may be configured to indicate the UE 202 through a response message that the first custom waveform is selected for preventing the ISI. In an embodiment, the response message may be transmitted via one of a DCI format, a RRC reconfiguration, a MIB, and a MAC CE. In an embodiment, the waveform switching to the first custom waveform for the DL transmission is indicated via one of an information element in a RRC reconfiguration message using a downlinkWaveformIndication parameter, an MIB using the downlinkWaveformIndication parameter, one of a MSG-2 and a MSG-4 waveform indication in a RACH-ConfigCommon message, a PDCCH channel with a second DCI and a number of reserved bits of a first DCI, and a MAC CE comprising a bitmap associated with at least one of the first custom waveform with each bit representing a subset for a value associated with the first custom waveform. In an embodiment, the information element may be one of a PDCCH configuration, a PDSCH configuration, and a PUSCH configuration.

In an embodiment, the waveform switching to the first custom waveform for the UL transmission is indicated via one of a RACH MSG3 waveform indication similar to a DFT-S-OFDM indication using a uplinkWaveformIndication parameter, a MIB using the uplinkWaveformIndication parameter, a PUSCH configuration in an RRC reconfiguration message, a PDCCH channel with a second DCI and a plurality of reserved bits of a first DCI, and a MAC CE comprising a bitmap associated with the first custom waveform with each bit representing a subset for a value associated with the first custom waveform.

In an embodiment, the MIB may include a downlinkWaveformIndication:=ENUMERATED{CP-OFDM, OTFS, spare1, spare2, ... } for the DL and uplinkWaveformIndication:=ENUMERATED{CP-OFDM, DFT-S-OFDM, OTFS, spare1, spare2, ... } for the UL.

In an embodiment, the RACH-ConfigCommon message may include a downlinkWaveformIndication:=ENUMERATED{CP-OFDM, OTFS, spare1, spare2, ... } for the DL and uplinkWaveformIndication:=ENUMERATED{CP-OFDM, DFT-S-OFDM, OTFS, spare1, spare2, ... } for the UL.

In an embodiment, the RRC reconfiguration may include a PDSCH-Config: downlinkWaveformIndication:=ENUMERATED{CP-OFDM, OTFS, spare1, spare2, ... } for the DL and a PUSCH-Config: uplinkWaveformIndication:=ENUMERATED{CP-OFDM, DFT-S-OFDM, OTFS, spare1, spare2, ... } for the UL.

| Parameter | No. of Bits | Description |
|---|---|---|
| Identifier of DCI format | 1 | Uplink/downlink dci format |
| Waveform indicator | $\log_2 N$ | To indicate one selected waveform out of N waveforms |

Table 6 Depicts a Short PDCCH, New DCI Format for Dedicated User or Group Common DCI

| Parameter | No. of Bits | Description |
|---|---|---|
| Identifier of DCI format | 1 | Uplink/Downlink flag |
| Carrier Indicator | 0 or 3 bits | Carrier Indication |
| UL/SUL indicator | 0/1 bit | Supplementary Uplink indication |
| BWP indicator | 0/1/2 bits | Bandwidth part indication |
| . | . | . |
| . | . | . |
| Waveform indicator | $\log_2 N$ | To indicate one selected waveform out of N waveforms |

Table 7 Depicts an Existing DCI Format Appending Waveform Indicator

In response to receiving the response message, the UE 202 may be configured to connect with the BS 204 using the first custom waveform. Moving forward, the process may include requesting (step 610a) the BS 204 by the UE 202 about replacing the first custom waveform with a second custom waveform selected by the UE 202 for preventing the ISI.

In an embodiment, for selecting the second custom waveform, the process may include determining by the UE 202 that a channel estimation parameter associated with the UE 202 is below a pre-determined threshold value when using the first custom waveform. In an embodiment, the channel estimation parameter may correspond to a delay spread of a channel for a high frequency communication. Further, the process may include calculating by the UE 202 the second custom waveform in response to determining that the channel estimation parameter is below the pre-determined threshold value. In an embodiment, the request may be transmitted through one of a PUCCH format and a PUSCH format.

To that understanding, the upon requesting the BS 204, the process may proceed towards, receiving (step 612a) from the BS 204 at the UE 202, an indication about an implementation of the second custom waveform through one of the PDCCH with a second DCI and a number of reserved bits of a first DCI.

Figure 6B:
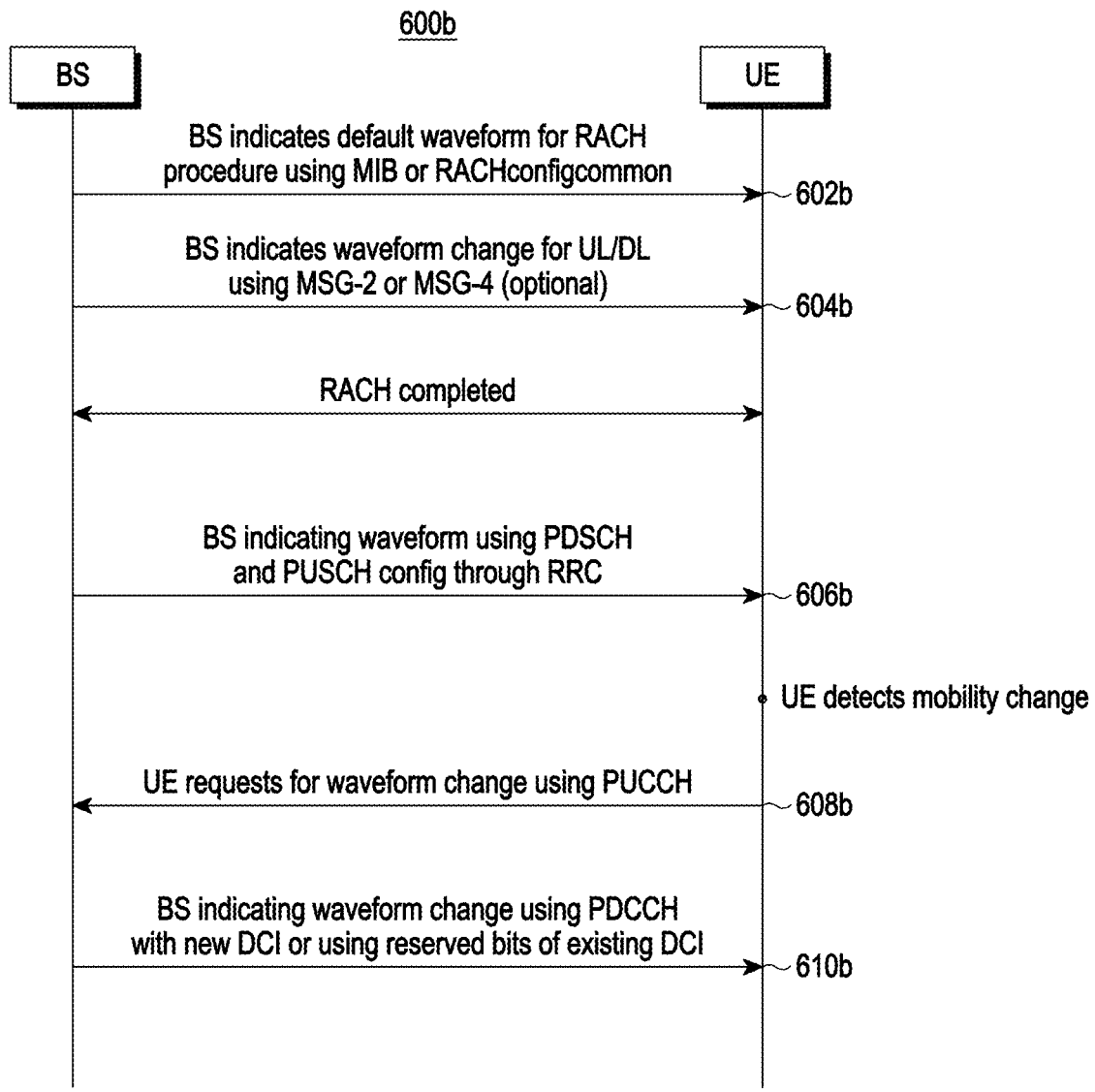
FIG. 6B illustrates an operational flow diagram depicting a process for switching waveforms for managing the ISI when the UE mandatorily supports each waveform from the list of waveforms by default in accordance with various embodiments of the present disclosure.

FIG. 6B illustrates an operational flow diagram 600b depicting a process for switching waveforms for managing the ISI when the UE 202 mandatorily supports each waveform from the list of waveforms by default in accordance with various embodiments of the present disclosure. In an embodiment, each waveform from the list of waveforms may be related to the UE 202.

Continuing with the above embodiment, the process may include indicating (step 602b) the UE 202 about the default waveform for initiating the RACH procedure by the BS 204 using one of the MIB and the radio resource control reconfiguration (RACHConfigCommon). Further, the initiated RACH procedure may be completed upon indicating the UE 202.

Upon indicating the UE 202 about the default waveform, the process may include indicating (604b) to the UE 202 by the BS 204, a change associated with the default waveform for one or more of the UL transmission and the DL transmission. In an embodiment, the change may be indicated upon indicating the UE 202 about the default waveform. Further, the process may include initiating the RACH procedure with the UE 202 upon indicating the UE 202 about the default waveform.

Moving forward, the process may include performing step 606b, 608b, and 610b similar to steps 608a-612a as described in the FIG. 6A for indicating that the second custom waveform may be selected for preventing the ISI when the UE 202 is communicating in the high frequency cellular network.

Figure 7A:
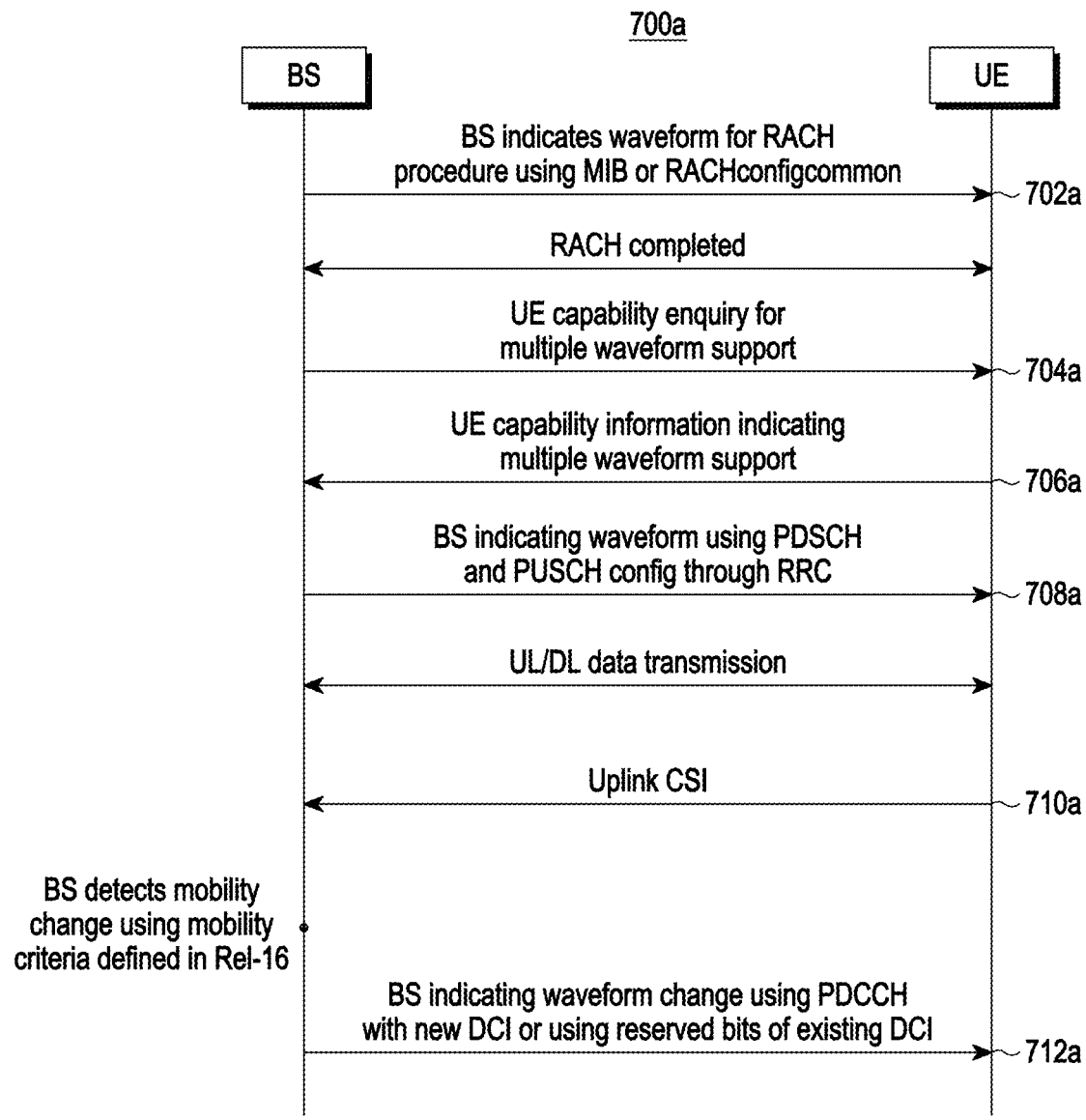
FIG. 7A illustrates an operational flow diagram depicting a process for switching waveforms for managing an ISI in a high frequency cellular network based on the BS identifying a mobility and a delay spread of a channel in accordance with various embodiments of the present disclosure.

FIG. 7A illustrates an operational flow diagram 700a depicting a process for switching waveforms for managing an ISI in a high frequency cellular network based on the BS 204 identifying a mobility and a delay spread of a channel in accordance with various embodiments of the present disclosure. In an embodiment, the managing the ISI may include preventing occurrence of the ISI when the UE 202 is operating in the high frequency cellular network. In an embodiment, the ISI may be managed by the UE 202 and the BS 204. In an embodiment, managing the ISI may be based on a number of waveforms in a list of waveforms associated with the UE 202 communicating in the high frequency cellular network.

Continuing with the above embodiment, the process may include indicating (step 702a) the UE 202 about a default waveform for initiating a RACH procedure by the BS 204. In an embodiment, the default waveform may be indicated using one of a MIB and a radio resource control reconfiguration (RACHConfigCommon). Further, the initiated RACH procedure may be completed upon indicating the UE 202.

Moving forward, upon successful completion of the RACH procedure between the UE 202 and the BS 204, the process may proceed towards transmitting (step 704a) an enquiry by the BS 204 to the UE 202 about a multiple waveform support. In an embodiment, the enquiry may be transmitted to obtain information about any waveform from the list of waveforms supported by the UE 202 that may be utilized for preventing the ISI. In an embodiment, the ISI may be prevented based on a configuration exchange between the UE 202 and the BS 204. In an embodiment, the configuration exchange may be related to switching waveforms for preventing the ISI.

Continuing with the above embodiment, in response to receiving the enquiry at the UE 202, the process may proceed towards transmitting (step 706a) at least one UE-Capability information element from the UE 202 to the BS 204. In an embodiment, the at least one UE-Capability information element may be an UECapabilityInfo message including an indication of a capability of the UE 202 to switch waveforms amongst a list of waveforms for an UL transmission and a DL transmission. In an embodiment, the UE 202 may be communicating through a previous waveform. In an embodiment, the UE 202 may mandatorily support a CP-OFDM, and a DFT-S-OFDM.

In response to receiving the at least one UE-Capability information element, the process may include indicating (step 708a) by the BS 204 to the UE 202, that a first custom waveform is selected for preventing the ISI. In an embodiment, the first custom waveform may be calculated from the list of waveforms in the at least one UE-Capability information element. In an embodiment, upon receiving the at least one UE-Capability information element, the BS 204 may be configured to determine a number of parameters associated with the UE 202 based on the list of waveforms for determining the number of parameters.

In an embodiment, the number of parameters may include at least one of channel information, speed of the UE, a mobility of the UE, a CSI feedback, a delay spread of a channel, a doppler spread/shift in the channel, and at least one other parameter derived from the channel information. Moving forward, the BS 204 may be configured to calculate the first custom waveform. In an embodiment, the first custom waveform may be calculated based on the number of parameters from the first list of waveforms.

In an embodiment, the BS 204 may be configured to indicate the UE 202 through a response message that the first custom waveform is selected for preventing the ISI to the UE 202. In an embodiment, the response message may be transmitted by the BS 204 to the UE 202 via one of a DCI format, a RRC reconfiguration, a MIB, and a MAC CE. In an embodiment, the waveform switching to the first custom waveform for the DL transmission is indicated via one of an information element in a RRC reconfiguration message using a downlinkWaveformIndication parameter, an MIB using the downlinkWaveformIndication parameter, one of a MSG-2 and a MSG-4 waveform indication in a RACH-ConfigCommon message, a PDCCH channel with a second DCI and a plurality of reserved bits of a first DCI, and a MAC CE comprising a bitmap associated with at least one of the first custom waveform with each bit representing a subset for a value associated with the first custom waveform. In an embodiment, the information element may be one of a PDCCH configuration, a PDSCH configuration, and a PUSCH configuration.

In an embodiment, the waveform switching to the first custom waveform for the UL transmission is indicated via one of a RACH MSG3 waveform indication similar to a DFT-S-OFDM indication using a uplinkWaveformIndication parameter, a MIB using the uplinkWaveformIndication parameter, a PUSCH configuration in an RRC reconfiguration message, a PDCCH channel with a second DCI and a plurality of reserved bits of a first DCI, and a MAC CE comprising a bitmap associated with the first custom waveform with each bit representing a subset for a value associated with the first custom waveform.

In response to transmitting the response message to the UE 202, the process may proceed towards receiving (step 710*a*) at the BS 204 an UL CSI to identify the delay spread of the channel. Moving forward, upon receiving the uplink CSI, the process may include determining by the BS 204 that a channel estimation parameter associated with the UE 202 is below the pre-determined threshold value when using the first custom waveform. In an embodiment, the channel estimation parameter may correspond to the delay spread of the channel for a high frequency communication. Upon the determination, the process may proceed towards calculating by the BS 204 a second custom waveform for preventing the ISI when the UE 202 may be communicating in the high frequency cellular network.

In an embodiment, once the BS 204 identifies a UE mobility as "not low mobility" as defined in Rel-16, the BS may eb configured to indicate the UE 202 with a OTFS waveform. Otherwise, the transmission may continue with the OFDM waveform. In an embodiment, where the UE 202 is identified as a "low mobility," the BS 204 may indicate the UE 202 with one of an OFDM and a DFT-S-OFDM waveform based on an DL and an UL transmission respectively. In an embodiment, the BS 204 may identify the mobility of the UE 202 as "Normal," "medium," or "high" based on a number of cell reselections using the RRC configured parameters of timers and serving cell reselection thresholds indicated as below:

a) $T_{CRmax}$—specifying a duration for evaluating allowed amount of cell reselection(s);
b) $N_{CR\_M}$—specifying a maximum number of cell reselections to enter medium-mobility state;
c) $N_{CR\_H}$—specifying a maximum number of cell reselections to enter high-mobility state; and
d) $T_{CRmaxHyst}$—specifying an additional time period before the UE can enter normal-mobility state.

Continuing with the above embodiment, the process may proceed towards indicating (step 712*a*) the UE 202 by the BS 204 about an implementation of the second custom waveform through one of a PDCCH with a second DCI and a number of reserved bits of a first DCI.

Figure 7B:
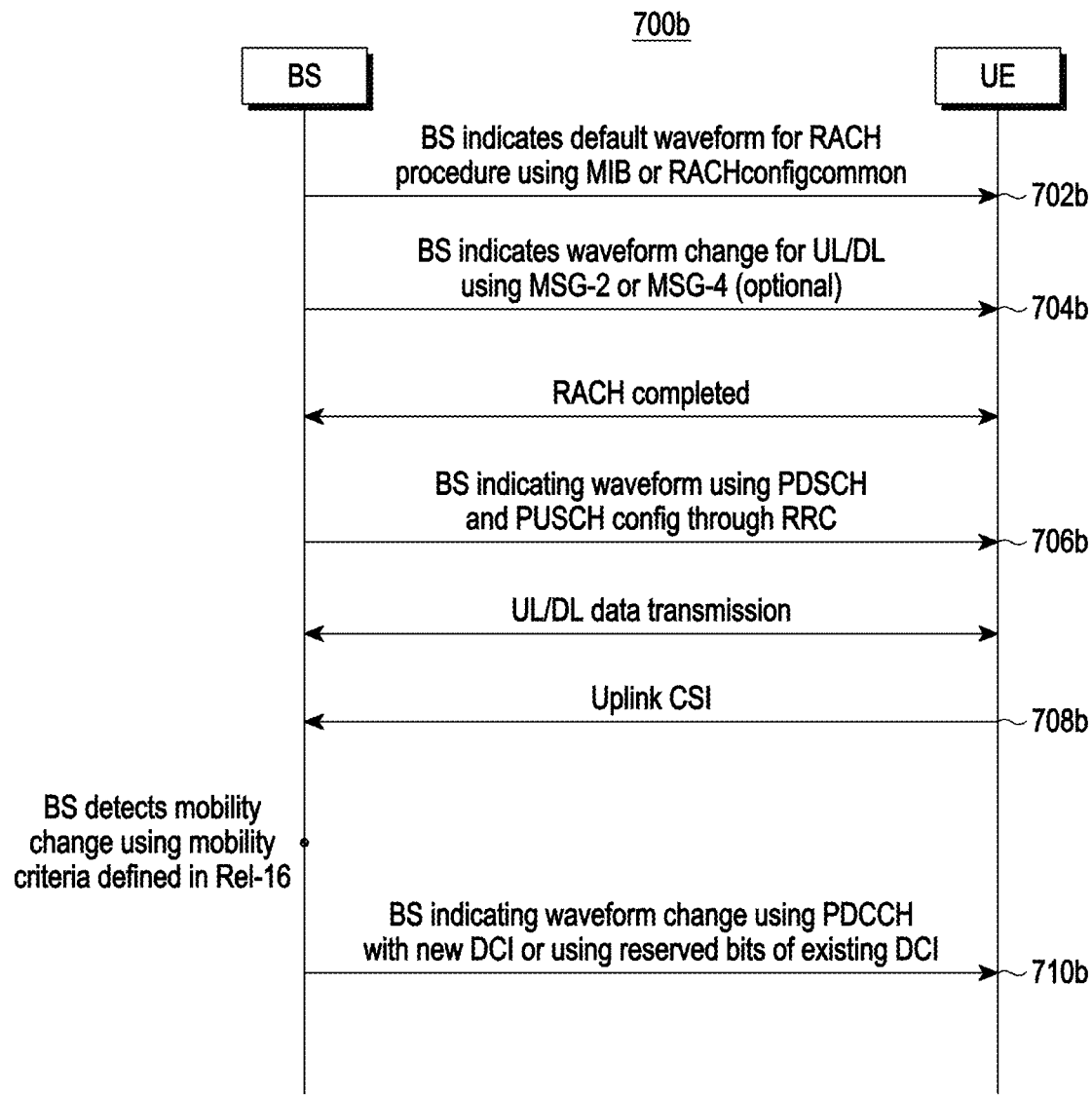
FIG. 7B illustrates an operational flow diagram depicting a process for switching waveforms for managing the ISI when the UE mandatorily supports each waveform from the list of waveforms by default in accordance with various embodiments of the present disclosure.

FIG. 7B illustrates an operational flow diagram 700*b* depicting a process for switching waveforms for managing the ISI when the UE 202 mandatorily supports each waveform from the list of waveforms by default in accordance with various embodiments of the present disclosure. In an embodiment, each waveform from the number of waveforms may be related to the UE 202.

Continuing with the above embodiment, the process may include indicating (step 702*b*) the UE 202 about a default waveform for initiating a RACH procedure by the BS 204. In an embodiment, the first waveform may be indicated using one of a MIB and a radio resource control reconfiguration (RACHConfigCommon). In an embodiment, the first waveform may be utilized to prevent the ISI when the UE 202 is communicating in the high frequency cellular network by the BS 204. Further, the initiated RACH procedure may be completed upon indicating the UE 202.

Upon indicating the UE 202 about the default waveform, the process may include indicating (704*b*) to the UE 202 by the BS 204, a change associated with the default waveform for one or more of an UL transmission and a DL transmission. In an embodiment, the change may be indicated upon indicating the UE 202 about the default waveform. Further, the process may include initiating the RACH procedure with the UE 202 upon indicating the UE 202 about the default waveform.

Moving forward, the process may include performing step 706*b*, 708*b*, 710*b* similar to steps 708*a*-712*a* as described in the FIG. 7A for indicating that the second waveform may be selected for preventing the ISI when the UE 202 is communicating in the high frequency cellular network.

Figure 8A:
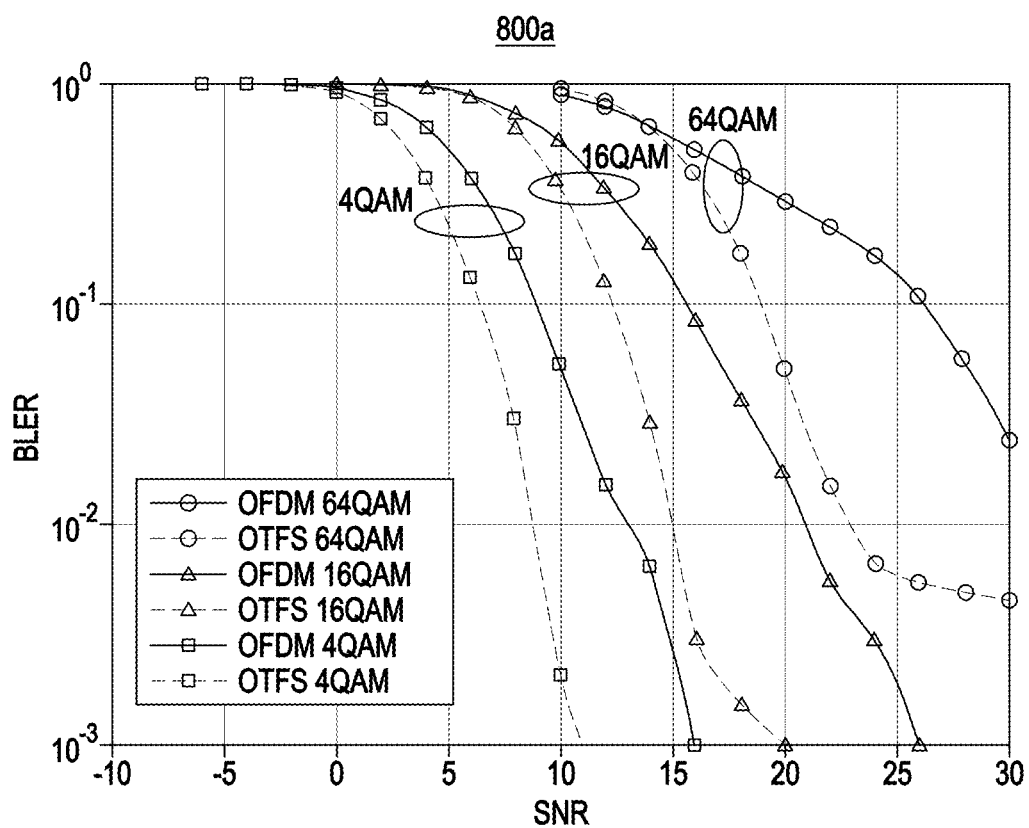
FIGS. 8A, 8B, and 8C illustrate graphical representations depicting a deterioration of an OFDM in high doppler conditions and a new waveform OTFS includes superior performance over OFDM in accordance with various embodiments of the present disclosure.

FIG. 8A illustrates a graphical representation 800*a* depicting a deterioration of an OFDM in high doppler conditions, and a new waveform orthogonal time frequency space (OTFS) includes superior performance over OFDM in accordance with various embodiments of the preset disclosure. In an embodiment, a doppler value may be 0.8 KHz.

Figure 8B:
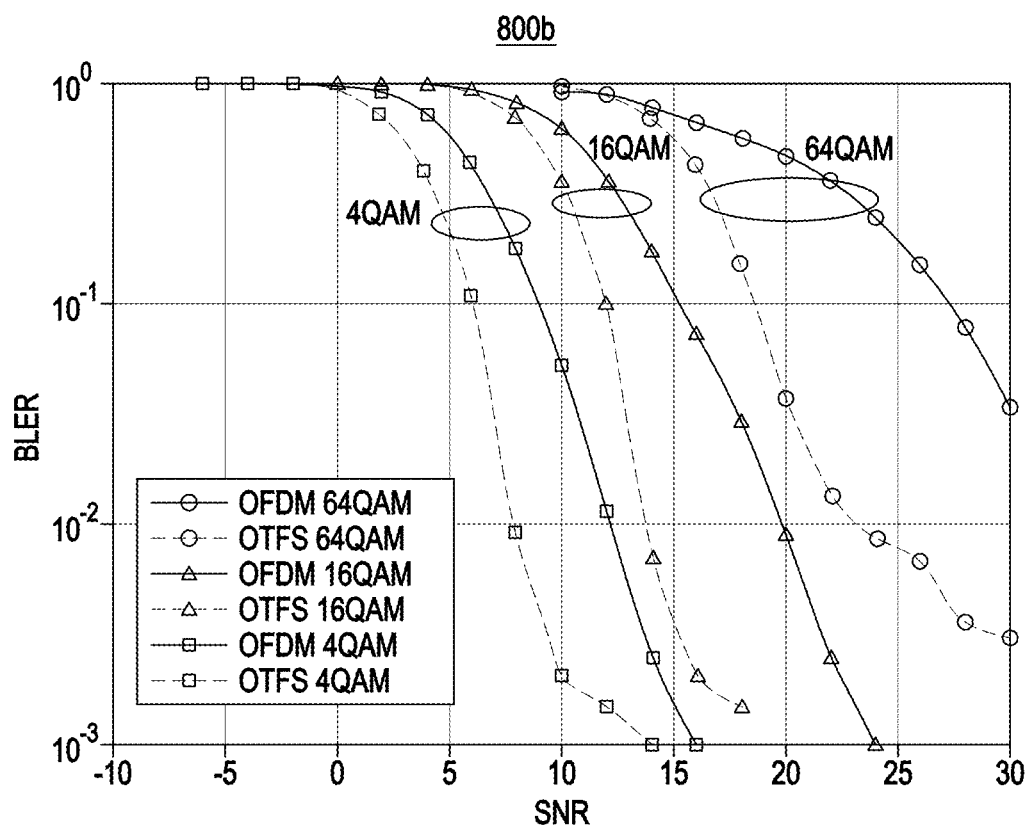

FIG. 8B illustrates a graphical representation 800*b* depicting a deterioration of an OFDM in high Doppler conditions, and a new waveform orthogonal time frequency space (OTFS) includes superior performance over OFDM when the doppler value may be 3 KHz in accordance with various embodiments of the preset disclosure.

Figure 8C:
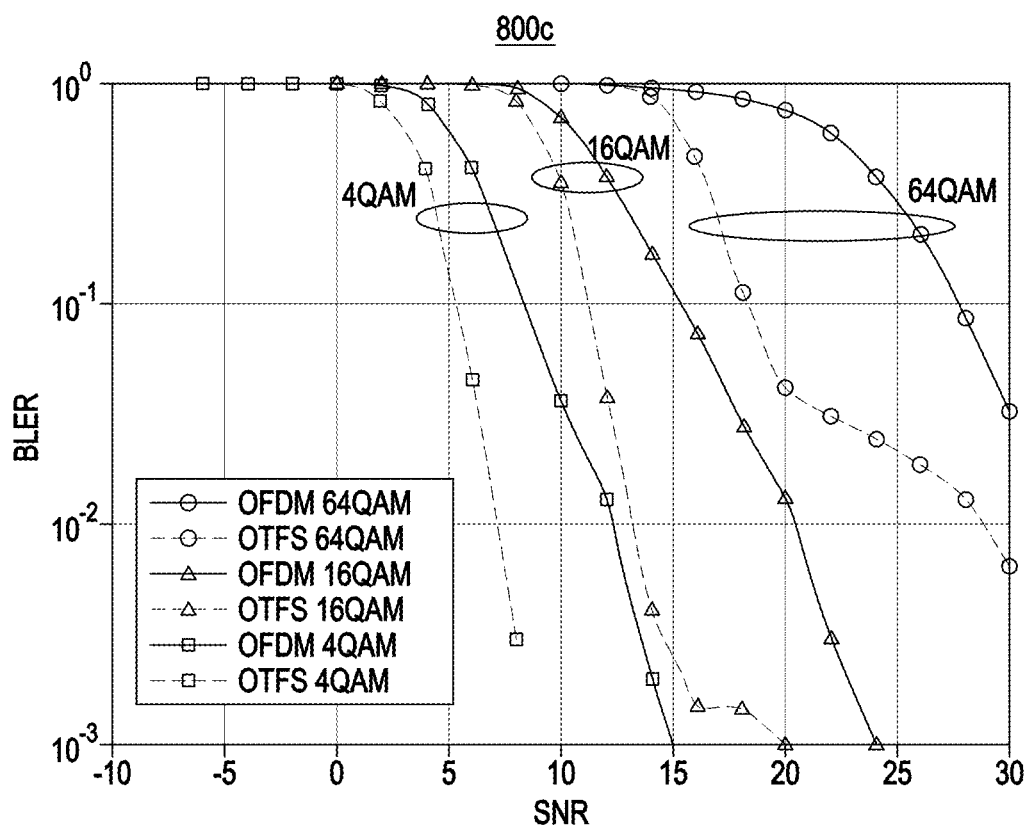

FIG. 8C illustrates a graphical representation 800*c* depicting a deterioration of an OFDM in high Doppler conditions, and a new waveform orthogonal time frequency space (OTFS) includes superior performance over OFDM when the doppler value may be 12 KHz in accordance with various embodiments of the preset disclosure.

In an embodiment, a BLER performance comparison between OTFS and OFDM waveforms for all the three modulation schemes (4,16 and 64 QAMs), at doppler shifts of 0.8 KHz, 3 KHz, and 12 KHz, respectively, for a TDL-C channel. Based on the FIGS. 8A, 8B, and 8C, it may be implied that an alternative of the OFDM may be needed for compensating a high Doppler in beyond 5G and 6G for improving a system performance.

| Doppler Shift | SNR gain | | |
|---|---|---|---|
| | 4-QAM | 16 QAM | 64-QAM |
| 0.8 KHz | 2.5 dB | 3 dB | 7.25 B |
| 3 KHz | 2.75 dB | 3.5 dB | 8 dB |
| 12 KHz | 3 dB | 4 dB | 10 dB |

Figure 9:
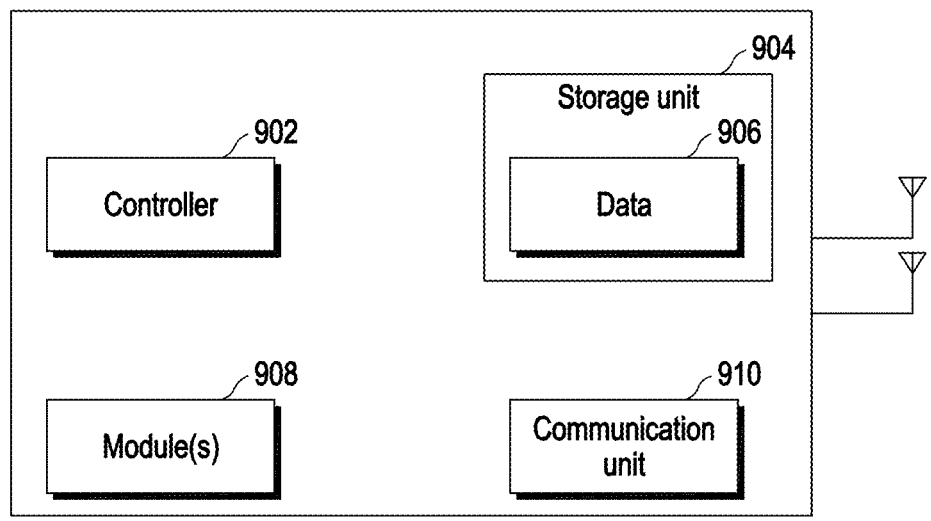
FIG. 9 is a diagram illustrating the configuration of a terminal in a wireless communication system in accordance with various embodiments of the present disclosure.

Table 8 Illustrates a Signal to Noise Ratio (SNR) Gain for OTFS Compared to OFDM FIG. 9 is a diagram illustrating the configuration of a terminal 900 in a wireless communication system according to an embodiment of the present disclosure. Hereinafter, it is understood that terms including "unit" or "er" at the end may refer to the unit for processing at least one function or operation and may be implemented in hardware, software, or a combination of hardware and software.

Referring to FIG. 9, the terminal 900 may include a controller 902 (e.g., at least one processor), a storage unit 904 (e.g., storage or memory), data 906 and, module(s) 908, and a communication unit 910 (e.g., transceiver, communicator or communication interface). By way of example, the terminal 900 may be the BS 204 as referred in the FIG. 1. In an embodiment, the controller 902, the storage unit 904, the data 906, and the module(s) 908, and the communication unit 910 may be communicably coupled with one another.

As would be appreciated, the terminal 900, may be understood as one or more of a hardware, a software, a logic-based program, a configurable hardware, and the like. In an example, the controller 902 may be a single processing unit or a number of units, all of which could include multiple computing units. The controller 902 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the controller 902 may be configured to fetch and/or execute computer-readable instructions and/or data 906 stored in the storage unit 904.

In an example, the storage unit 904 may include any non-transitory computer-readable medium known in the art including, for example, volatile memory, such as static random-access memory (SRAM) and/or dynamic random-access memory (DRAM), and/or non-volatile memory, such as read-only memory (ROM), erasable programmable ROM (EPROM), flash memory, hard disks, optical disks, and/or magnetic tapes. The storage unit 904 may store data, such as a basic program, an application program, configuration information, and the like for operating the terminal 900. The storage unit 904 may be configured as a volatile memory, a non-volatile memory, or a combination of a volatile memory and a non-volatile memory. The storage unit 904 may include the data 906. In addition, the storage unit 904 may provide data stored therein in response to a request from the controller 902.

The data 906 serves, amongst other things, as a repository for storing data processed, received, and generated by one or more of, the controller 902, the storage unit 904, the module(s) 908, and the communication unit 910.

The module(s) 908, amongst other things, may include routines, programs, objects, components, data structures, etc., which perform particular tasks or implement data types. The module(s) 908 may also be implemented as, signal processor(s), state machine(s), logic circuitries, and/or any other device or component that manipulate signals based on operational instructions.

Further, the module(s) 908 may be implemented in hardware, instructions executed by at least one processing unit, for e.g., controller 902, or by a combination thereof. The processing unit may be a general-purpose processor which executes instructions to cause the general-purpose processor to perform operations or, the processing unit may be dedicated to performing the required functions. In another aspect of the present disclosure, the module(s) 908 may be machine-readable instructions (software) which, when executed by a processor/processing unit, may perform any of the described functionalities.

In some example embodiments, the module(s) 908 may be machine-readable instructions (software) which, when executed by a processor/processing unit, perform any of the described functionalities.

The controller 902 may control overall operations of the terminal 900. For example, the controller 902 may transmit and receive a signal via the communication unit 910. Further, the controller 902 records data in the storage unit 904 and reads the recorded data. The controller 902 may perform the functions of a protocol stack required by a particular communication standard. To this end, the controller 902 may include at least one processor or micro-processor or may be a part of the processor. Also, a part of the communication unit 910 and the controller 902 may be referred to as a communication processor (CP).

Referring to FIG. 2, the communication unit 910 may be configured to receive at least one UE-Capability information element from the UE 202. In an embodiment, the at least one UE-Capability information element may be an UECapabilityInfo message including a first list of CP lengths and a second list of SCS.

Continuing with the above embodiment, in response to receiving the at least one UE-Capability information element, the controller 902 may be configured to determine a number of parameters associated with the UE 202 based on the first list of CP lengths and the second list of SCS. Subsequent to determining the number of parameters, the controller 902 may be configured to calculate at least one of a first custom CP length and a first SCS based on the number of parameters from the first list of CP lengths and the second list of SCS. In response to calculation of at least one of the first custom CP length and the first SCS, the communication unit 910 may be configured to transmit the calculated at least one of the first custom CP length and the first SCS to the UE 202. Moving forward, the communication unit 910 may be configured to receive from the UE 202 at least one of a second custom CP length and a second SCS selected by the UE 202 for managing the ISI. In an embodiment, managing the ISI may include preventing the ISI.

Referring to FIG. 3A, the communication unit 910 may be configured to indicate the UE 202 about at least one of a default CP length and a default SCS for initiating a RACH procedure. Further, the initiated RACH procedure may be completed upon indicating the UE 202. Further, the communication unit 910 may be configured to transmit an enquiry to the UE 202 about a custom CP length and a multiple SCS support. In an embodiment, the enquiry may be transmitted to obtain information about at least one of at least one custom CP length and at least one SCS supported by the UE 202 that may be utilized for managing the ISI.

Continuing with the above embodiment, the communication unit 910 may be configured to receive from the UE 202 at least one UE-Capability information element. including a first list of CP lengths and a second list of SCS. In response to receiving the at least one UE-Capability information element by the BS 204, the communication unit 910 may be configured to indicate the UE 202, that at least one of a first custom CP length and a first SCS is selected for managing the ISI to the UE 202. In an embodiment, the at least one of the first custom CP length and the first SCS may be calculated by the controller 902 from the first list of CP lengths and the second list of SCS. In an embodiment, upon receiving the first list of CP lengths and the second list of SCS, the controller 902 may be configured to determine a number of parameters associated with the UE 202 based on the first list of CP lengths and the second list of SCS.

In an embodiment, the communication unit 910 may be configured to indicate the UE 202 through a response message indicating that at least one of the first custom CP length and the first SCS is selected for managing the ISI to the UE 202. Furthermore, the communication unit 910 may be configured to receive a request from the UE 202 about replacing at least one of first custom CP length and the first SCS with at least one of a second custom CP length and a second SCS selected by the UE 202 for managing the ISI. To that understanding, the communication unit 910 may be configured to transmitting to the UE 202, an indication about an implementation of the at least one of the second custom CP length and the second SCS.

Referring to FIG. 3B, in an embodiment, the communication unit 910 may be configured to indicate the UE 202 about at least one of a default CP length and a default SCS for initiating a RACH procedure when the UE 202 mandatorily supports each CP length and each SCS by default. Further, upon indicating the UE 202 about at least one of the default CP length and the default SCS, the communication unit 910 may be configured indicate the UE 202 about a change associated with at least one of the default CP and the default SCS for one or more of an UL transmission and a DL transmission. In an embodiment, the communication unit 910 may be configured to indicate the UE 202 through a response message that at least one of the first custom CP length and the first SCS is selected for managing the ISI to the UE 202. Furthermore, the communication unit 910 may be configured to receive a request from the UE 202 about replacing at least one of the first custom CP length and the first SCS with at least one of the second custom CP length and the second SCS selected by the UE 202 for managing the ISI. To that understanding, the communication unit 910 may be configured to transmit to the UE 202, an indication about the implementation of the at least one of the second custom CP length and the second SCS.

Referring to FIG. 4A, the communication unit 910 may be configured to receive at the BS 204 an UL CSI to identify the delay spread of the channel. Moving forward, upon receiving the uplink CSI, the controller 902 may be configured to determine that a channel estimation parameter associated with the UE 202 is below the pre-determined threshold value when using at least one of the first custom CP length and the first SCS. In an embodiment, a channel estimation parameter may correspond to the delay spread of the channel for the high frequency communication. Upon the determination, the controller 902 may be configured to calculate at least one of a second custom CP length and a second SCS for managing the ISI when the UE 202 may be communicating in the high frequency cellular network. Continuing with the above embodiment, the communication unit 910 may be configured to indicate the UE 202 an implementation of at least one of the second custom CP length and the second SCS to the UE 202 for managing the ISI through one of a PDCCH with a second DCI and a number of reserved bits of a first DCI.

Referring to FIG. 4B, in an embodiment, where the UE 202 mandatorily supports each CP length and each SCS by default and the BS 204 identifies a mobility and a delay spread of a channel, the communication unit 910 may be configured to indicate the UE 202 about at least one of a default CP length and a default SCS for initiating a RACH procedure by the BS 204. Upon indicating the UE 202 about at least one of the default CP length and the default SCS by the BS 204, the communication unit 910 may be configured to indicate the UE 202 a change associated with at least one of the default CP and the default SCS for one or more of an UL transmission and a DL transmission. In an embodiment, the change may be indicated upon indicating the UE 202 about the default CP and the default SCS. Further, the process may include initiating the RACH procedure with the UE 202 upon indicating the UE 202 about the default CP and the default SCS.

Referring to FIG. 5, the communication unit 910 may be configured to receive at least one UE-Capability information element from the UE 202. In an embodiment, the at least one UE-Capability information element may be an UECapabilityInfo message including an indication of a capability of the UE 202 to switch waveforms amongst a list of waveforms for an UL transmission and a DL transmission. Continuing with the above embodiment, in response to receiving the at least one UE-Capability information element, the controller 910 may be configured to determine a number of parameters associated with the UE 202. In an embodiment, the number of parameters may be determined based on the capability of the UE 202 for the switching waveforms.

Subsequent to determining the number of parameters, the controller 902 may be configured to determine a first custom waveform from the list of waveforms for a high frequency communication in the high frequency cellular network. In an embodiment, the first custom waveform may be utilized for managing the ISI in the high frequency cellular network. In response to determination of the first custom waveform, the communication unit 910 may be configured to transmit the determined first custom waveform to the UE 202. In an embodiment, the determined fust custom waveform may be transmitted to the UE 202 within a response message indicating that the first custom waveform is selected for managing the ISI.

Further, the communication unit 910 may be configured to receive a second custom waveform for managing the ISI. In an embodiment, the second custom waveform may be transmitted to the BS 204 via one of PUCCH format and a PUSCH format. In an embodiment, the second custom waveform may be utilized by the UE 202 for the communication in the high frequency cellular network.

Referring to the FIG. 6A, the communication unit 910 may be configured to indicate the UE 202 about a default waveform for initiating a RACH procedure by the BS 204. In an embodiment, the default waveform may be indicated using one of an MIB and a radio resource control reconfiguration (RACHConfigCommon).

Further, the communication unit 910 may be configured to transmit an enquiry to the UE 202 about a multiple waveform support. In an embodiment, the enquiry may be transmitted to obtain information about a custom waveform supported by the UE 202 that may be utilized for managing the ISI. Continuing with the above embodiment, the communication unit 910 may be configured to receive at least one UE-Capability information element from the UE 202 including an indication of a capability of the UE 202 to switch waveforms amongst a list of waveforms for the UL transmission and the DL transmission. In response to receiving the at least one UE-Capability information element, the communication unit 910 may be configured to indicate the UE 202, that a first custom waveform is selected for managing the ISI calculated by the controller 902 from the list of waveforms amongst which the UE 202 is capable to switch waveforms as indicated in the at least one UE-CapabilityInfo element.

In an embodiment, upon receiving the indication, the controller 902 may be configured to determine a number of parameters associated with the UE 202 based on the first list waveforms. Moving forward, the controller 902 may be configured to calculate the first custom waveform based on the number of parameters. In an embodiment, the communication unit 910 may be configured to indicate the UE 202 through a response message indicating that the first custom waveform is selected for managing the ISI.

Further, the communication unit 910 may be configured to receive a request from the UE 202 about replacing the first custom waveform with a second custom waveform. In an embodiment, the second custom waveform may be selected by the UE 202 for managing the ISI. Further, the communication unit 910 may be configured to transmit to the UE 202, an indication about an implementation of the second custom waveform. In an embodiment, the BS 204 may be configured to transmit the indication through one of a PDCCH with a second DCI and a number of reserved bits of a first DCI.

Referring to FIG. 6B, where the UE 202 mandatorily supports each waveform from the list of waveforms by default, the communication unit 910 may be configured to indicate the UE 202 about the default waveform for initiating the RACH procedure by the BS 204. Upon indicating the UE 202 about the default waveform by the BS 204, the communication unit 910 may be configured to indicate the UE 202, a change associated with the default waveform for one or more of the UL transmission and the DL transmission.

Referring to FIG. 7A, the communication unit 910 may be configured to receive at the BS 204 an UL CSI to identify the delay spread of the channel from the UE 202. Moving forward, upon receiving the uplink CSI, the controller 902 may be configured to determine that a channel estimation parameter associated with the UE 202 is below the predetermined threshold value when using the first custom waveform. In an embodiment, the channel estimation parameter may correspond to the delay spread of the channel for a high frequency communication. Upon the determination, the controller 902 may be configured to calculate a second custom waveform for managing the ISI when the UE 202 may be communicating in the high frequency cellular network. Continuing with the above embodiment, the communication unit 910 may be configured to indicate the UE 202 about an implementation of the second custom waveform.

Referring to the FIG. 7B where the UE 202 mandatorily supports each waveform from the list of waveforms by default, the communication unit 910 may be configured to indicate the UE 202 about a default waveform for initiating a RACH procedure. In an embodiment, the default waveform may be indicated using one of an MIB and a radio resource control reconfiguration (RACHConfigCommon). Upon indicating the UE 202 about at least one of the default waveform, the communication unit 910 may be configured to indicate the UE 202 a change associated with the default waveform for one or more of an UL transmission and a DL transmission.

Figure 10:
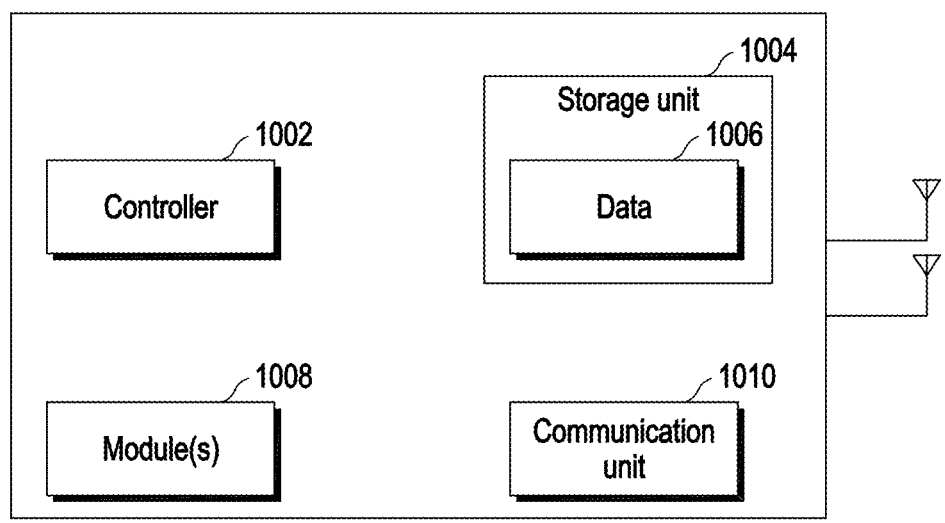
FIG. 10 is a diagram illustrating the configuration of a terminal in a wireless communication system in accordance with various embodiments of the present disclosure.

FIG. 10 is a diagram illustrating the configuration of a terminal 1000 in a wireless communication system according to an embodiment of the present disclosure. Hereinafter, it is understood that terms including "unit" or "er" at the end may refer to the unit for processing at least one function or operation and may be implemented in hardware, software, or a combination of hardware and software.

Referring to FIG. 10, the terminal 1000 may include a controller 1002 (e.g., at least one processor), a storage unit 1004 (e.g., storage or memory), data 1006 and, module(s) 1008, and a communication unit 1010 (e.g., transceiver, communicator or communication interface). By way of example, the terminal 1000 may be a User Equipment, such as a cellular phone or other device that communicates over a plurality of cellular networks (such as a 4G, a 5G or pre-5G network or any future wireless communication network). In an embodiment, the terminal 1000 may be the UE 202. In an embodiment, the controller 1002, the storage unit 1004, the data 1006, and the module(s) 1008, and the communication unit 1010 may be communicably coupled with one another.

As would be appreciated, the terminal 1000, may be understood as one or more of a hardware, a software, a logic-based program, a configurable hardware, and the like. In an example, the controller 1002 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the controller 1002 may be configured to fetch and/or execute computer-readable instructions and/or data 1006 stored in the storage unit 1004.

In an example, the storage unit 1004 may include any non-transitory computer-readable medium known in the art including, for example, volatile memory, such as static random-access memory (SRAM) and/or dynamic random-access memory (DRAM), and/or non-volatile memory, such as read-only memory (ROM), erasable programmable ROM (EPROM), flash memory, hard disks, optical disks, and/or magnetic tapes. The storage unit 1004 may store data, such as a basic program, an application program, configuration information, and the like for operating the terminal 1000. The storage unit 1004 may be configured as a volatile memory, a non-volatile memory, or a combination of a volatile memory and a non-volatile memory. The storage unit 1004 may include the data 1006. In addition, the storage unit 1004 may provide data stored therein in response to a request from the controller 1002.

The data 1006 serves, amongst other things, as a repository for storing data processed, received, and generated by one or more of, the controller 1002, the storage unit 1004, the module(s) 1008, and the communication unit 1010.

The module(s) 1008, amongst other things, may include routines, programs, objects, components, data structures, etc., which perform particular tasks or implement data types. The module(s) 1008 may also be implemented as, signal processor(s), state machine(s), logic circuitries, and/or any other device or component that manipulate signals based on operational instructions.

Further, the module(s) 1008 may be implemented in hardware, instructions executed by at least one processing unit, for e.g., controller 1002, or by a combination thereof. The processing unit may be a general-purpose processor which executes instructions to cause the general-purpose processor to perform operations or, the processing unit may be dedicated to performing the required functions. In another aspect of the present disclosure, the module(s) 1008 may be machine-readable instructions (software) which, when executed by a processor/processing unit, may perform any of the described functionalities.

In some example embodiments, the module(s) 1008 may be machine-readable instructions (software) which, when executed by a processor/processing unit, perform any of the described functionalities.

The controller 1002 may control overall operations of the terminal 1000. For example, the controller 1002 may transmit and receive a signal via the communication unit 1010. Further, the controller 1002 records data in the storage unit 1004 and reads the recorded data. The controller 1002 may perform the functions of a protocol stack required by a particular communication standard. To this end, the controller 1002 may include at least one processor or microprocessor or may be a part of the processor. Also, a part of the communication unit 1010 and the controller 1002 may be referred to as a communication processor (CP).

Referring to FIG. 2, the communication unit 1010 may be configured to transmit to the BS 204 at least one UE-Capability information element from the UE 202. In an embodiment, the at least one UE-Capability information element may be an UECapabilityInfo message. In an embodiment, the at least one UE-Capability information element may include a first list of CP lengths and a second list of SCS.

In response to transmitting the at least one UE-Capability information element, the communication unit 1010 may be configured to receive at least one of the first custom CP length and the first SCS to the UE 202. In an embodiment, the calculated at least one of the custom CP length and the first SCS may be received by the communication unit 1010 within a response message indicating that at least one of the first custom CP length and the first SCS is selected for managing the ISI. In an embodiment, managing the ISI may include preventing the ISI.

In response to receiving the response message, the communication unit 1010 may be configured to connect the UE 202 with the BS 204. Upon connecting with the BS 204, the controller 1002 may be configured to determine that a channel estimation parameter associated with the UE 202 is below a pre-determined threshold value when using at least one of the first custom CP length and the first SCS. In an embodiment, the channel estimation parameter may be related to a delay spread of a channel for a high frequency communication by the UE 202.

To that understanding, the controller 1002 may be configured to calculate at least one of a second custom CP length and a second SCS related to the UE 202 for the high frequency communication in response to determining that the channel estimation parameter is below the pre-determined threshold value. In response to calculating at least one of the second custom CP length and the second SCS, the communication unit 1010 may be configured to transmit the at least one of the second custom CP length and the second SCS to the BS 204 for managing the ISI.

Referring to FIG. 3A, the communication unit 1010 may be configured to receive an indication from the BS 204 about at least one of a default CP length and a default SCS for initiating a RACH procedure by the BS 204. Further, the communication unit 1010 may be configured to transmit at least one UE-Capability information element to the BS 204 in response to receiving the enquiry at the UE 202 about a custom CP length and a multiple SCS support. Furthermore, the communication unit 1010 may be configured to receive an indication from the BS 204 that at least one of a first custom CP length and a first SCS is selected for managing the ISI.

Moving forward, the communication unit 1010 may be configured to receive a response message from the BS 204 and connect with the BS 204. Upon connecting, the communication unit 1010 may be configured to request the BS 204 about replacing the at least one of first custom CP length and the first SCS with at least one of a second custom CP length and a second SCS. In an embodiment, selecting the at least one of the second custom CP length and the second SCS, the controller 1002 may be configured to determine that a channel estimation parameter associated with the UE 202 is below a pre-determined threshold value when using at least one of the first custom CP length and the first SCS. In an embodiment, the channel estimation parameter may correspond to a delay spread of a channel for a high frequency communication. Further, the controller 1002 may be configured to calculate the at least one of the second custom CP length and the second SCS in response to determining that the channel estimation parameter is below the pre-determined threshold value. Further, the communication unit 1010 may be configured to transmit a request to the SB 204 for selecting at least one of the second custom CP length and the second SCS for managing the ISI. To that understanding, the upon requesting the BS 204, the communication unit 1010 may be configured to receive from the BS 204 an indication about an implementation of the at least one of the second custom CP length and the second SCS.

Referring to FIG. 3B, where the UE 202 mandatorily supports each CP length and each SCS by default, the communication unit 1010 may be configured to receive an indication from the BS 204 about at least one of a default CP length and a default SCS for initiating a RACH procedure. Further, the communication unit 1010 may be configured to receive an indication about a change associated with at least one of the default CP and the default SCS for one or more of an UL transmission and a DL transmission.

In an embodiment, the communication unit 1010 may be configured to receive an indication from the BS 204 that at least one of a first custom CP length and a first SCS is selected for managing the ISI. Moving forward, the communication unit 1010 may be configured to receive a response message from the BS 204 and connect with the BS 204. Upon connecting, the communication unit 1010 may be configured to request the BS 204 about replacing the at least one of first custom CP length and the first SCS with at least one of a second custom CP length and a second SCS. In an embodiment, the controller 1002 may be configured to calculate the at least one of the second custom CP length and the second SCS based on the channel estimation parameter.

Further, the communication unit 1010 may be configured to transmit a request to the BS 204 for selecting at least one of the second custom CP length and the second SCS for managing the ISI. To that understanding, the upon requesting the BS 204, the communication unit 1010 may be configured to receive from the BS 204 an indication about an implementation of the at least one of the second custom CP length and the second SCS.

Referring to FIG. 4A, where the BS 204 may be configured to identify a mobility and a delay spread of a channel, the communication unit 1010 may be configured to receive from the BS 204 an indication about at least one of a default CP length and a default SCS for initiating a RACH procedure and further, may receive an enquiry from the BS 204 about a custom CP length and a multiple SCS support.

In an embodiment, the communication unit 1010 may be configured to transmit at least one UE-Capability information element from the UE 202 to the BS 204. In an embodiment, the at least one UE-Capability information element may include a first list of CP lengths and a second list of SCS. Further, the communication unit 1010 may be configured to receive an indication from the BS 204, that at least one of a first custom CP length and a first SCS is selected for managing the ISI. Moving forward, the communication unit 1010 may be configured to transmit an UL CSI to identify the delay spread of the channel to the BS 204. Further, the communication unit 1010 may be configured to receive an indication from the BS 204 that at least one of a second custom CP length and a second SCS is selected for managing the ISI.

Referring to FIG. 4B, where the UE 202 mandatorily supports each CP length and each SCS by default, the communication unit 1010 may be configured to receive an indication about at least one of a default CP length and a default SCS for initiating a RACH procedure, and indication about a change associated with at least one of the default CP and the default SCS for one or more of an UL transmission and a DL transmission from the BS 204. Further, the communication unit 1010 may be configured to receive an indication from the BS 204, that at least one of a first custom CP length and a first SCS is selected for managing the ISI.

Moving forward, the communication unit 1010 may be configured to transmit an UL CSI to identify the delay spread of the channel to the BS 204. Further, the communication unit 1010 may be configured to receive an indication from the BS 204 that at least one of a second custom CP length and a second SCS is selected for managing the ISI.

Referring to FIG. 5, the communication unit 1010 may be configured to transmit to the BS 204 at least one UE-Capability information element including include an indication of a capability of the UE 202 to switch waveforms amongst a list of waveforms for an UL transmission and a DL transmission. Further, the communication unit 1010 may be configured to receive a response message from the BS 204 indicating that a first custom waveform is selected for managing the ISI. In response to receiving the response message, the communication unit 1010 may be configured to connect with the BS 204.

Upon connecting with the BS 204, the controller 1002 may be configured to determine that a channel estimation parameter associated with the UE 202 is below a pre-determined threshold value when using the first custom waveform. In an embodiment, the channel estimation parameter may be related to a delay spread of a channel for a high frequency communication by the UE 202. To that understanding, the controller 1002 may be configured to calculate a second custom waveform related to the UE 202 for the high frequency communication in response to determining that the channel estimation parameter is below the pre-determined threshold value. In response to calculating the second custom waveform, the communication unit 1010 may be configured to transmit the second custom waveform to the BS 204 for managing the ISI.

Referring to FIG. 6A, the communication unit 1010 may be configured to receive an indication about a default waveform for initiating a RACH procedure from the BS 204. Moving forward, upon successful completion of the RACH procedure between the UE 202 and the BS 204, the communication unit 1010 may be configured to receive an enquiry from the BS 204 about a multiple waveform support.

Continuing with the above embodiment, in response to receiving the enquiry, the communication unit 1010 may be configured to transmit at least one UE-Capability information element including an indication of a capability of the UE 202 to switch waveforms amongst a list of waveforms for an UL transmission and a DL transmission to the BS 204. Further, the communication unit 1010 may be configured to receive an indication from the BS 204 that a first custom waveform is selected for managing the ISI within a response message.

In response to receiving the response message, the communication unit 1010 may be configured to connect with the BS 204 using the first custom waveform and request to replace the first custom waveform with a second custom waveform selected by the controller 1002 for managing the ISI. In an embodiment, the controller 1002 may be configured to determine that a channel estimation parameter associated with the UE 202 is below a pre-determined threshold value when using the first custom waveform. Further, the controller 1002 configured to calculate the second custom waveform in response to determining that the channel estimation parameter is below the pre-determined threshold value. To that understanding, the upon requesting the BS 204, the controller 1002 may be configured to receive from the BS 204 an indication about an implementation of the second custom waveform.

Referring to FIG. 6B, where the UE 202 mandatorily supports each waveform from the list of waveforms by default, the communication unit 1010 may be configured to receive an indication about the default waveform for initiating the RACH procedure and an indication about a change associated with the default waveform for one or more of an UL transmission and a DL transmission from the BS 204. Further, the communication unit 1010 may be configured to receive an indication from the BS 204 that a first custom waveform is selected for managing the ISI within a response message.

the communication unit 1010 may be configured to connect with the BS 204 using the first custom waveform and request to replace the first custom waveform with a second custom waveform selected by the controller 1002 for managing the ISI. In an embodiment, the controller 1002 may be configured to determine that a channel estimation parameter associated with the UE 202 is below a pre-determined threshold value when using the first custom waveform. Further, the controller 1002 configured to calculate the second custom waveform in response to determining that the channel estimation parameter is below the pre-determined threshold value. To that understanding, the upon requesting the BS 204, the controller 1002 may be configured to receive from the BS 204 an indication about an implementation of the second custom waveform.

Referring to the FIG. 7A, the communication unit 1010 may be configured to receive an indication about a default waveform for initiating a RACH procedure, and an enquiry by the BS 204 to the UE 202 about a multiple waveform support from the BS 204. Continuing with the above embodiment, in response to receiving the enquiry, the communication unit 1010 may be configured to transmit at least one UE-Capability information element from the UE 202 including an indication of a capability of the UE 202 to switch waveforms amongst a list of waveforms for an UL transmission and a DL transmission. Further, the communication unit 1010 may receive an indication that a first custom waveform is selected for managing the ISI. Further, the communication unit 1010 may be configured to transmit an UL CSI to identify the delay spread of the channel to the BS 204. Further, the communication unit 1010 may receive an indication about an implementation of a second custom waveform.

Referring to FIG. 7B, where the UE 202 mandatorily supports each waveform from the list of waveforms by default, the communication unit 1010 may receive the indication about the default waveform and another indication about a change associated with the default waveform for one or more of an UL transmission and a DL transmission from the BS 204. Further, the communication unit 1010 may receive an indication that a first custom waveform is selected for managing the ISI. Further, the communication unit 1010 may be configured to transmit an UL CSI to identify the delay spread of the channel to the BS 204. Further, the communication unit 1010 may receive an indication about an implementation of a second custom waveform.

Figure 11:
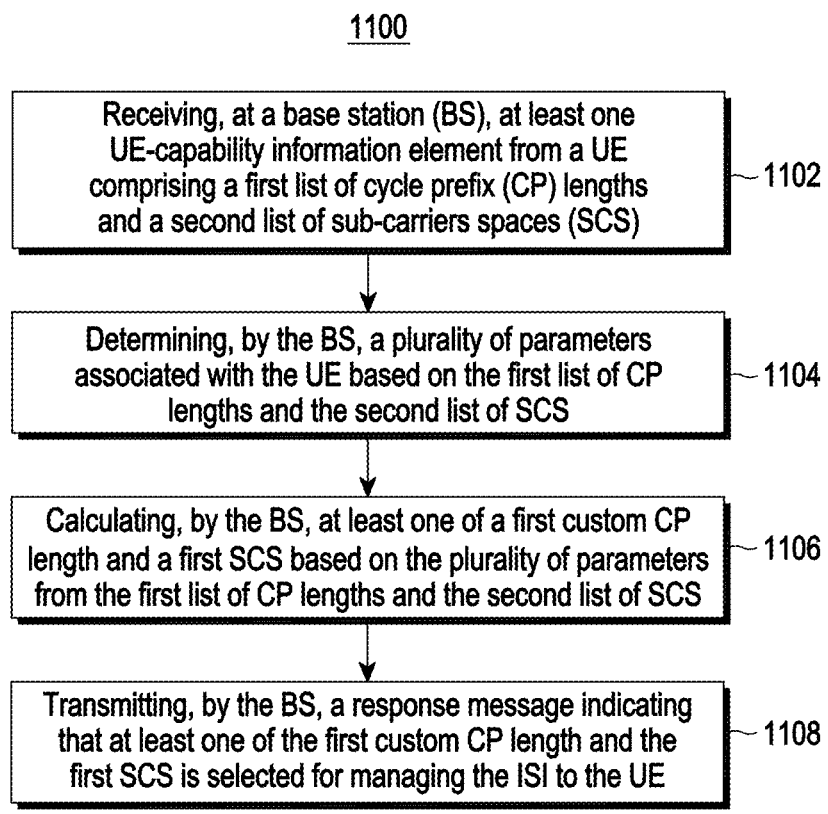
FIG. 11 illustrates a block diagram depicting a method for managing an ISI in a high frequency cellular network in accordance with various embodiments of the present disclosure.

FIG. 11 illustrates a block diagram 1100 depicting a method for managing an ISI in a high frequency cellular network in accordance with various embodiments of the present disclosure. In an embodiment, the method may be performed by the BS 204, and components thereof.

At block 1102, the method includes, receiving, at a BS, at least one UE-capability information element from a UE comprising a first list of CP lengths and a second list of SCS.

At block 1104, the method includes, determining, by the BS, a plurality of parameters associated with the UE based on the first list of CP lengths and the second list of SCS.

At block 1106, the method includes, calculating, by the BS, at least one of a first custom CP length and a first SCS based on the plurality of parameters from the first list of CP lengths and the second list of SCS.

At block 1108, the method includes, transmitting, by the BS, a response message indicating that at least one of the first custom CP length and the first SCS is selected for managing the ISI to the UE.

Figure 12:
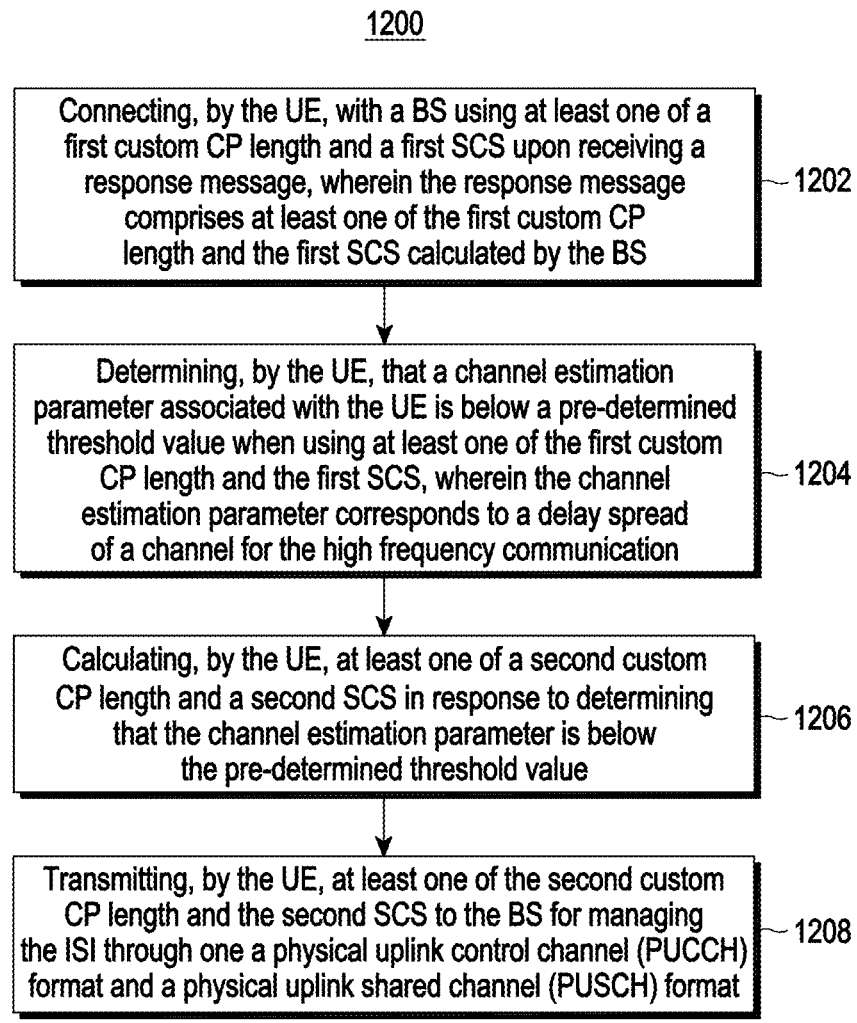
FIG. 12 illustrates a block diagram depicting a method in a UE for managing an ISI in a high frequency cellular network in accordance with various embodiments of the present disclosure.

FIG. 12 illustrates a block diagram 1200 depicting a method in a UE for managing an ISI in a high frequency cellular network in accordance with various embodiments of the present disclosure. In an embodiment, the method may be performed by the UE 202, and components thereof.

At block 1202, the method includes, connecting, by the UE, with a BS using at least one of a first custom CP length and a first SCS upon receiving a response message, wherein the response message comprises at least one of the first custom CP length and the first SCS calculated by the BS.

At block 1204, the method includes, determining, by the UE, that a channel estimation parameter associated with the UE is below a pre-determined threshold value when using at least one of the first custom CP length and the first SCS, wherein the channel estimation parameter corresponds to a delay spread of a channel for a high frequency communication.

At block 1206, the method includes, calculating, by the UE, at least one of a second custom CP length and a second SCS in response to determining that the channel estimation parameter is below the pre-determined threshold value.

At block 1208, the method includes, transmitting, by the UE, at least one of the second custom CP length and the second SCS to the BS for managing the ISI through one of a PUCCH format and a PUSCH format.

Figure 13:
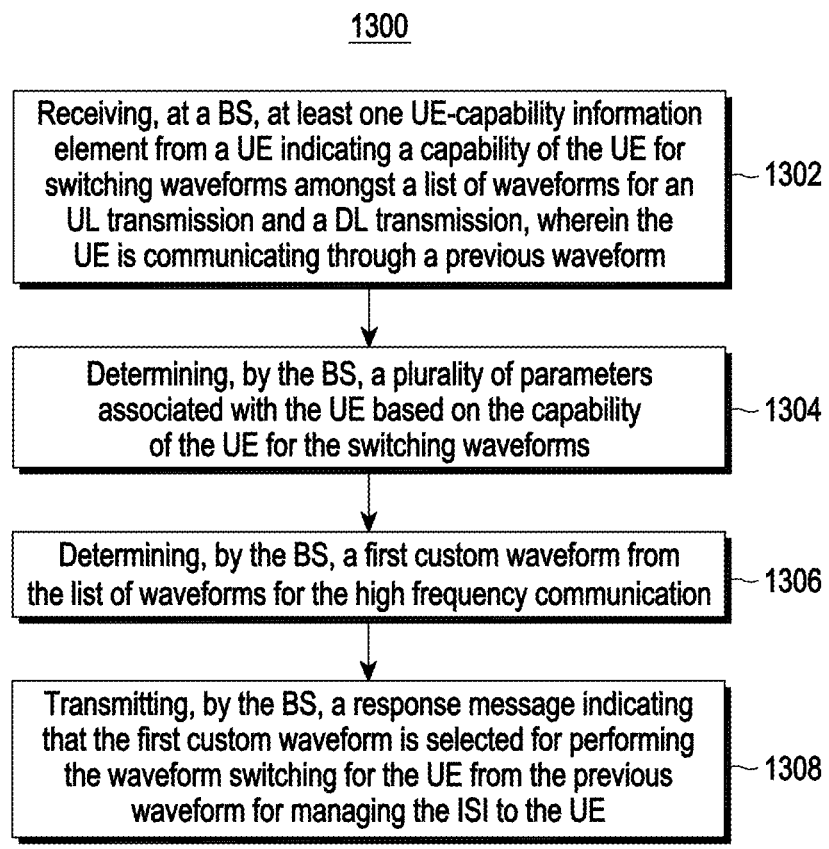
FIG. 13 illustrates a block diagram depicting a method for switching waveforms for managing an ISI in a high frequency cellular network in accordance with various embodiments of the present disclosure.

FIG. 13 illustrates a block diagram 1300 depicting a method for switching waveforms for managing an ISI in a high frequency cellular network in accordance with various embodiments of the present disclosure. In an embodiment, the method may be performed by the BS 204, and components thereof.

At block 1302, the method includes, receiving, at a BS, at least one UE-Capability information element from a UE indicating a capability of the UE for switching waveforms amongst a list of waveforms for an UL transmission and a DL transmission, wherein the UE is communicating through a previous waveform.

At block 1304, the method includes, determining, by the BS, a plurality of parameters associated with the UE based on the capability of the UE for the switching waveforms.

At block 1306, the method includes, determining, by the BS, a first custom waveform from the list of waveforms for a high frequency communication.

At block 1308, the method includes, transmitting, by the BS, a response message indicating that the first custom waveform is selected for performing the waveform switching for the UE from the previous waveform for managing the ISI to the UE.

Figure 14:
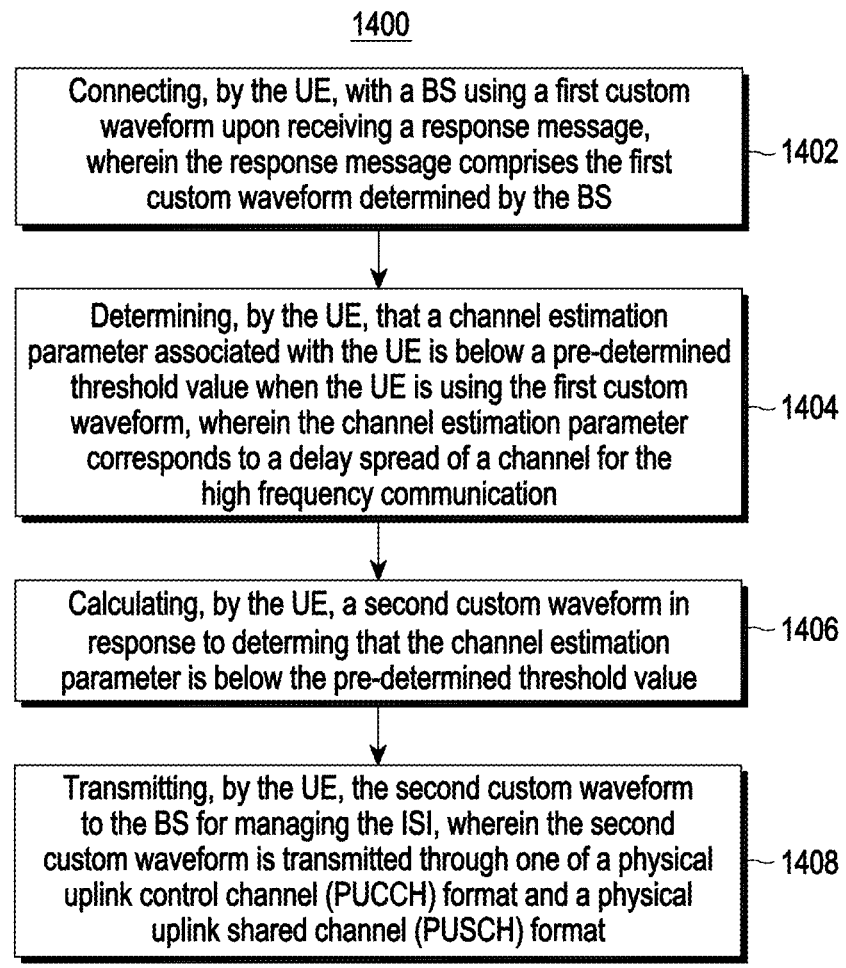
FIG. 14 illustrates a block diagram depicting a method in a UE for switching waveforms for managing an ISI in a high frequency cellular network in accordance with various embodiments of the present disclosure.

FIG. 14 illustrates a block diagram 1400 depicting a method in a UE for switching waveforms for managing an ISI in a high frequency cellular network in accordance with various embodiments of the present disclosure. In an embodiment, the method may be performed by the UE 202, and components thereof.

At block 1402, the method includes connecting, by the UE, with a BS using a first custom waveform upon receiving a response message, wherein the response message comprises the first custom waveform determined by the BS.

At block 1404, the method includes, determining, by the UE, that a channel estimation parameter associated with the UE is below a pre-determined threshold value when the UE is using the first custom waveform, wherein the channel estimation parameter corresponds to a delay spread of a channel for a high frequency communication.

At block 1406, the method includes, calculating, by the UE, a second custom waveform in response to determining that the channel estimation parameter is below the pre-determined threshold value.

At block 1408, the method includes, transmitting, by the UE, the second custom waveform to the BS for managing the ISI, wherein the second custom waveform is transmitted through one of a PUCCH format and a PUSCH format.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a base station (BS) for managing an inter-symbol interference (ISI) in a cellular network, the method comprising:
   receiving, from a user equipment (UE), at least one UE-capability information element comprising a list of cycle prefix (CP) lengths and a list of sub-carriers spaces (SCSs);
   determining a plurality of parameters associated with the UE based on the list of CP lengths and the list of SCSs;
   determining at least one of a first custom CP length or a first SCS based on the plurality of parameters from the list of CP lengths and the list of SCSs; and
   transmitting, to the UE, an indication that at least one of the first custom CP length or the first SCS is selected for managing the ISI.

2. The method of claim 1, wherein the list of CP lengths comprises a normal CP length and one or more extended CP lengths associated with an orthogonal frequency-division multiplexing (OFDM) symbol duration.

3. The method of claim 1, wherein the plurality of parameters comprises at least one of channel information, a speed of the UE, a mobility of the UE, a channel state information (CSI) feedback, a delay spread of a channel, a doppler spread/shift in the channel, or at least one parameter derived from the channel information.

4. The method of claim 1, further comprising transmitting the indication using one of:
   downlink control information (DCI) format comprising at least one of an identifier of the DCI format for at least one of the first custom CP length or the first SCS, a number of bits associated with at least one of the first custom CP length or the first SCS, a description indicating at least one of the first custom CP length or the first SCS;
a radio resource control reconfiguration comprising at least one of the first custom CP length or the first SCS;
a master information block (MIB) comprising at least one of the first custom CP length or the first SCS; and
a medium access control element (MAC CE) comprising a bitmap associated with at least one of the first custom CP length or the first SCS, wherein each bit of the bitmap represents a subset for a CP length value associated with the first custom CP length and a SCS value associated with the first SCS.

5. The method of claim 1, further comprising:
indicating a default CP and a default SCS for initiating a random access channel (RACH) procedure using one of an MIB and a RACHConfigCommon message; and
instructing the UE to indicate capability of the UE for a plurality of SCSs and a plurality of CP lengths through at least one UE-capability information element when the RACH procedure is completed.

6. The method of claim 5, the method further comprises:
indicating a change associated with at least one of the default CP or the default SCS for one or more of an uplink (UL) transmission and a downlink (DL) transmission, wherein the change is indicated when indicating the default CP and the default SCS for the UE;
initiating the RACH procedure with the UE when indicating the default CP and the default SCS for the UE;
indicating, to the UE, at least one of the first custom CP length or the first SCS is selected for managing the ISI;
receiving, from the UE, at least one of a second custom CP length or a second SCS for managing the ISI, wherein the BS receives the at least one of the second custom CP length and the second SCS through one of a physical uplink control channel (PUCCH) format or a physical uplink shared channel (PUSCH) format; and
indicating, to the UE, a configuration of at least one of the second custom CP length or the second SCS using one of a physical downlink control channel (PDCCH) with a second DCI and a plurality of reserved bits of a first DCI,
wherein each SCS among the plurality of SCSs, and each CP length among the plurality of CP lengths is supported by the UE.

7. The method of claim 6, wherein at least one of the second custom CP length or the second SCS is determined by:
determining, by the UE, that a channel estimation parameter associated with the UE is less than a pre-determined threshold value when the UE uses at least one of the first custom CP length or the first SCS, wherein the channel estimation parameter corresponds to a delay spread of a channel for a high frequency communication; and
calculating, by the UE, that at least one of the second custom CP length or the second SCS in response to determining that the channel estimation parameter is less than the pre-determined threshold value.

8. The method of claim 7, further comprises:
receiving an UL CSI to identify the delay spread of the channel in response to indicating to the UE that at least one of the first custom CP length or the first SCS is selected for managing the ISI;
determining that the channel estimation parameter associated with the UE is less than the pre-determined threshold value when using at least one of the first custom CP length or the first SCS, wherein the channel estimation parameter corresponds to the delay spread of the channel for the high frequency communication;
determining at least one of the second custom CP length or the second SCS in response to determining that the channel estimation parameter is less than the pre-determined threshold value; and
transmitting, to the UE, at least one of the second custom CP length or the second SCS for managing the ISI through one of a PDCCH with a second DCI and a plurality of reserved bits of a first DCI.

9. A method of a UE for managing an inter-symbol interference (ISI) in a high frequency cellular network, the method comprising:
connecting with a base station (BS) using at least one of a first custom cyclic prefix (CP) length or a first sub-carrier spacing (SCS) when receiving an indication of at least one of the first custom CP length or the first SCS calculated by the BS;
determining that a channel estimation parameter associated with the UE is less than a pre-determined threshold value when using at least one of the first custom CP length or the first SCS, wherein the channel estimation parameter corresponds to a delay spread of a channel for a high frequency communication;
determining at least one of a second custom CP length or a second SCS in response to determining that the channel estimation parameter is less than the pre-determined threshold value; and
transmitting, to the BS, at least one of the second custom CP length or the second SCS for managing the ISI through one of a physical uplink control channel (PUCCH) format or a physical uplink shared channel (PUSCH) format.

10. The method of claim 9, further comprises:
receiving, from the BS, an indication for a configuration of at least one of the second custom CP length or the second SCS, wherein the UE receives the indication through one of a physical downlink control channel (PDCCH) with a second downlink control information (DCI) and a plurality of reserved bits of a first DCI.

11. A base station (BS) for managing an inter-symbol interference (ISI) in a cellular network, the BS comprising:
memory storing instructions;
a transceiver; and
at least one processor operably coupled to the memory and the transceiver, wherein the instructions, when executed by the at least one processor, cause the BS to:
receive at least one user equipment (UE)-capability information element comprising a list of cycle prefix (CP) lengths and a list of sub-carriers spaces (SCSs);
determine a plurality of parameters associated with a UE based on the list of CP lengths and the list of SCSs;
determine at least one of a first custom CP length or a first SCS based on the plurality of parameters from the list of CP lengths and the list of SCS; and
transmit, to the UE, an indication that at least one of the first custom CP length or the first SCS is selected for managing the ISI.

12. The BS of claim 11, wherein the list of CP lengths comprises a normal CP length and one or more extended CP lengths associated with an orthogonal frequency-division multiplexing (OFDM) symbol duration.

13. The BS of claim 11, wherein the plurality of parameters comprises at least one of channel information, speed of the UE, a mobility of the UE, a channel state information (CSI) feedback, a delay spread of a channel, a doppler spread/shift in the channel, or at least one parameter derived from the channel information.

14. The BS of claim 11, wherein the instructions, when executed by the at least one processor, cause the BS to transmit, to the UE, the indication using one of:
a downlink control information (DCI) format comprising at least one of an identifier of the DCI format for at least one of the first custom CP length or the first SCS, a number of bits associated with at least one of the first custom CP length or the first SCS, a description indicating at least one of the first custom CP length or the first SCS;
a radio resource control reconfiguration comprising at least one of the first custom CP length or the first SCS;
a master information block (MIB) comprising at least one of the first custom CP length or the first SCS; and
a medium access control element (MAC CE) comprising a bitmap associated with at least one of the first custom CP length or the first SCS, each bit of the bitmap representing a subset for a CP length value associated with the first custom CP length and a SCS value associated with the first SCS.

15. The BS of claim 11, wherein the instructions, when executed by the at least one processor, cause the BS further to:
indicate a default CP and a default SCS for initiating a random access channel (RACH) procedure using one of an MIB and a RACHConfigCommon message; and
instructing the UE to indicate capability of the UE for a plurality of SCSs and a plurality of CP lengths through at least one UE-capability information element when the RACH procedure is completed.

16. The BS of claim 15, wherein:
each SCS among the plurality of SCSs, and each CP length among the plurality of CP lengths is supported by the UE;
wherein the instructions, when executed by the at least one processor, cause the BS further to:
indicate a change associated with at least one of the default CP or the default SCS for one or more of an uplink (UL) transmission and a downlink (DL) transmission, wherein the change is indicated when indicating the default CP and the default SCS for the UE;
initiate the RACH procedure with the UE when indicating the default CP and the default SCS for the UE;
indicate, to the UE, that at least one of the first custom CP length or the first SCS is selected for managing the ISI;
the at least one processor is further configured to receive from the UE, at least one of a second custom CP length or a second SCS for managing the ISI, wherein the BS receives the at least one of the second custom CP length or the second SCS through one of a physical uplink control channel (PUCCH) format or a physical uplink shared channel (PUSCH) format; and
the at least one processor is further configured to indicate, to the UE, a configuration of at least one of the second custom CP length or the second SCS using one of a physical downlink control channel (PDCCH) with a second DCI and a plurality of reserved bits of a first DCI.

17. The BS of claim 16, wherein the instructions, when executed by the at least one processor, cause the BS further, for determining at least one of the second custom CP length or the second SCS, to:

determine that a channel estimation parameter associated with the UE is less than a pre-determined threshold value when the UE uses at least one of the first custom CP length or the first SCS, wherein the channel estimation parameter corresponds to a delay spread of a channel for a high frequency communication; and
calculate that at least one of the second custom CP length or the second SCS in response to determining that the channel estimation parameter is less than the pre-determined threshold value.

18. The BS of claim 17, wherein:
the instructions, when executed by the at least one processor, cause the BS further to:
receive an UL CSI to identify the delay spread of the channel in response to indicating to the UE that at least one of the first custom CP length or the first SCS is selected for managing the ISI;
determine that the channel estimation parameter associated with the UE is less than the pre-determined threshold value when using at least one of the first custom CP length or the first SCS, the channel estimation parameter corresponding to the delay spread of the channel for the high frequency communication;
determine at least one of the second custom CP length or the second SCS in response to determining that the channel estimation parameter is less than the pre-determined threshold value; and
transmit, to the UE, at least one of the second custom CP length or the second SCS for managing the ISI through one of a PDCCH with a second DCI and a plurality of reserved bits of a first DCI.

19. A user equipment (UE) for managing an inter-symbol interference (ISI) in a cellular network, the UE comprising:
memory storing instructions,
a transceiver; and
at least one processor operably coupled to the memory and the transceiver, wherein the instructions when executed by the at least one processor, cause the UE to:
connect with a base station (BS) using at least one of a first custom cyclic prefix (CP) length or a first sub-carrier spacing (SCS) when receiving an indication of at least one of the first custom CP length or the first SCS calculated by the BS;
determine that a channel estimation parameter associated with the UE is less than a pre-determined threshold value when using at least one of the first custom CP length or the first SCS, wherein the channel estimation parameter corresponds to a delay spread of a channel for a high frequency communication;
determine at least one of a second custom CP length or a second SCS in response to determining that the channel estimation parameter is less than the pre-determined threshold value; and
transmit, to the BS, at least one of the second custom CP length or the second SCS for managing the ISI through one of a physical uplink control channel (PUCCH) format and a physical uplink shared channel (PUSCH) format.

20. The UE of claim 19, wherein the instructions, when executed by the at least one processor, cause the UE further to:
  receive, from the BS, an indication for a configuration of at least one of the second custom CP length or the second SCS, the UE receiving the indication through one of a physical downlink control channel (PDCCH) with a second downlink control information (DCI) and a plurality of reserved bits of a first DCI.

* * * * *